(12) United States Patent
Raymond

(10) Patent No.: US 11,306,749 B1
(45) Date of Patent: *Apr. 19, 2022

(54) FLUID-POWERED LINEAR MOTOR WITH ROTARY PISTONS AND MOTION RECTIFIER AND SYNTHETIC DIAMOND BEARING ASSEMBLIES

(71) Applicant: National Technology & Engineering Solutions of Sandia, LLC, Albuquerque, NM (US)

(72) Inventor: David W. Raymond, Edgewood, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 0 days.

This patent is subject to a terminal disclaimer.

(21) Appl. No.: 17/013,306

(22) Filed: Sep. 4, 2020

Related U.S. Application Data

(63) Continuation-in-part of application No. 16/153,265, filed on Oct. 5, 2018, now Pat. No. 10,767,670.

(60) Provisional application No. 62/569,074, filed on Oct. 6, 2017.

(51) Int. Cl.
| | |
|---|---|
| *F15B 15/06* | (2006.01) |
| *F15B 7/00* | (2006.01) |
| *F16H 49/00* | (2006.01) |
| *F16H 25/22* | (2006.01) |
| *E21B 6/02* | (2006.01) |

(52) U.S. Cl.
CPC ........... *F15B 15/063* (2013.01); *F15B 7/001* (2013.01); *F15B 7/008* (2013.01); *F16H 25/2204* (2013.01); *F16H 49/001* (2013.01); *E21B 6/02* (2013.01); *F16H 2049/008* (2013.01)

(58) Field of Classification Search
CPC ...... F15B 15/02; F15B 15/068; F15B 15/063; F01L 21/04
See application file for complete search history.

(56) References Cited

U.S. PATENT DOCUMENTS

| | | | | |
|---|---|---|---|---|
| 1,413,499 | A * | 4/1922 | Smith | E21B 19/086 173/9 |
| 2,051,839 | A * | 8/1936 | Gartin | F01B 17/02 91/239 |
| 2,081,919 | A * | 6/1937 | Gartin | E21B 21/01 173/78 |
| 3,059,619 | A * | 10/1962 | Beaumont | E21B 4/14 173/64 |

(Continued)

*Primary Examiner* — Thomas E Lazo
(74) *Attorney, Agent, or Firm* — Daniel J. Jenkins

(57) ABSTRACT

A fluid-powered linear motor with rotary pistons is disclosed. An application is for a downhole motor but it could be used in other applications. Rotational pistons provide increased torque generation as the torque generated is proportional to motor length. Since downhole drills are long (generally up to a maximum length of 30 ft.), a high-torque motor can be produced using this method. A pressurized fluid is used to drive the piston assemblies to produce bit shaft power. This concept employs rotary pistons and a mechanical rectifier to convert the rotational reciprocation produced by a reciprocating rotational piston into continuous rotary motion. Integration of synthetic diamond bearing assemblies into the motor allows for reduced friction and abrasive drilling fluid compatibility.

34 Claims, 20 Drawing Sheets

(56) References Cited

U.S. PATENT DOCUMENTS

| | | | | |
|---|---|---|---|---|
| 3,612,191 | A * | 10/1971 | Martini | E21B 4/14 173/73 |
| 3,766,831 | A * | 10/1973 | Yeakley | F15B 15/063 92/2 |
| 4,867,000 | A * | 9/1989 | Lentz | F15B 15/02 475/31 |
| 5,253,939 | A * | 10/1993 | Hall | E21B 4/003 384/303 |
| 5,267,398 | A * | 12/1993 | Hall | E21B 4/003 29/464 |
| 5,634,390 | A * | 6/1997 | Takeuchi | F15B 15/061 74/424.73 |
| 6,609,577 | B2 * | 8/2003 | Beccu | B25B 19/00 173/104 |
| 6,742,605 | B2 * | 6/2004 | Martini | E21B 4/10 175/107 |
| 7,416,034 | B2 * | 8/2008 | Downie | E21B 17/076 175/107 |
| 7,527,130 | B2 | 5/2009 | Baudendistel et al. | |
| 9,447,798 | B1 * | 9/2016 | Raymond | E21B 4/02 |
| 10,767,670 | B2 * | 9/2020 | Raymond | F16H 25/2204 |

* cited by examiner

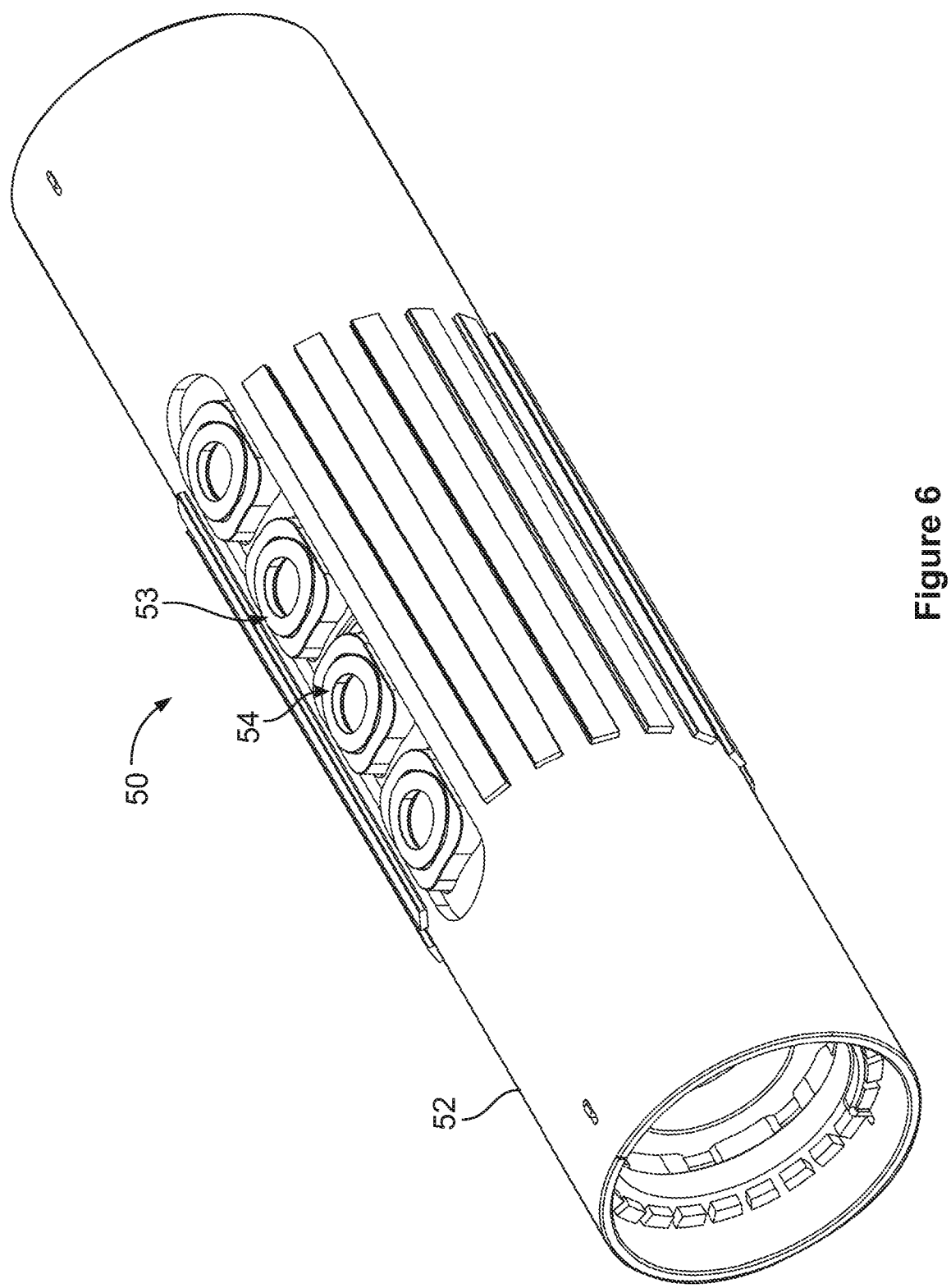

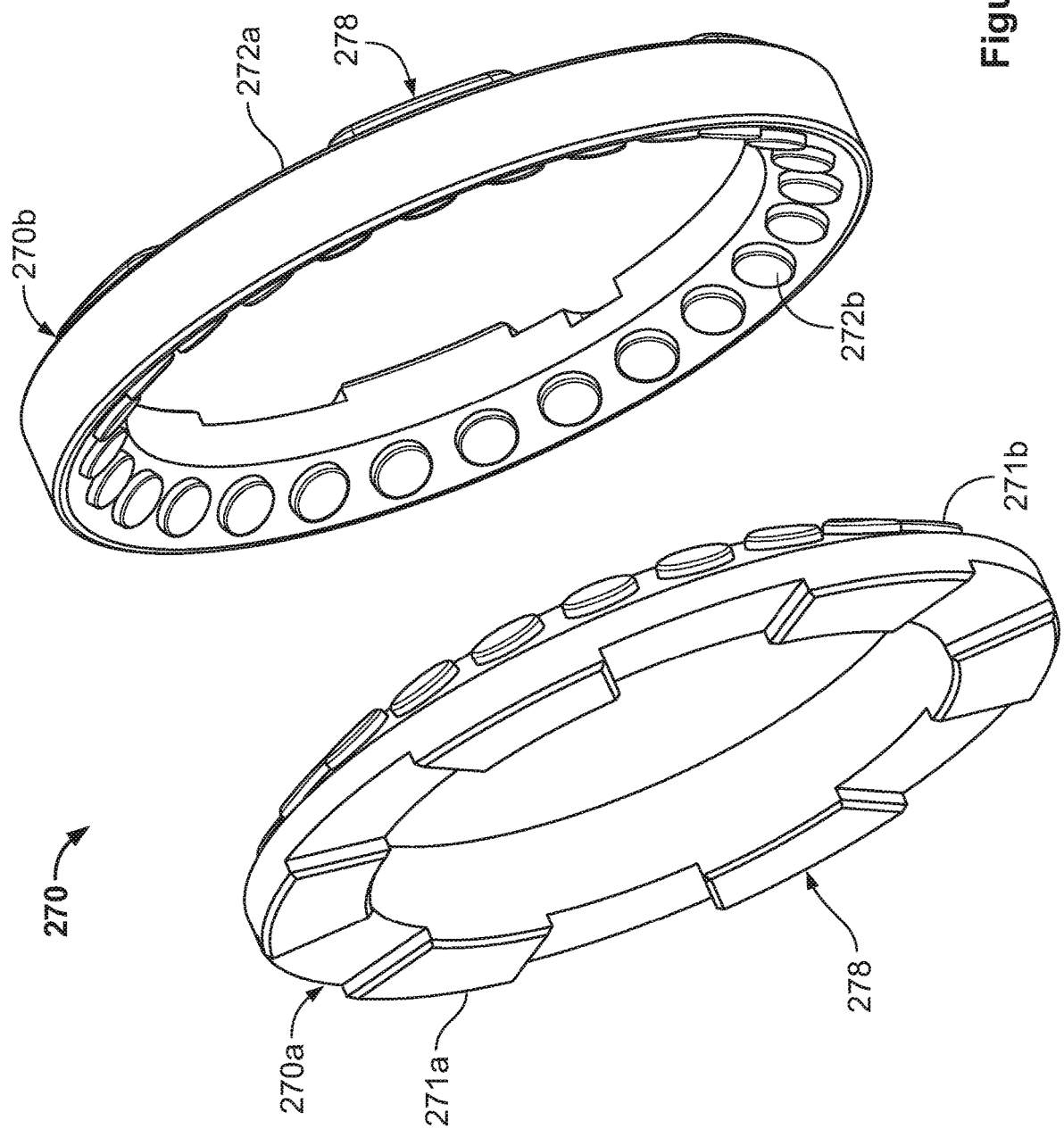

FLUID-POWERED LINEAR MOTOR WITH ROTARY PISTONS AND MOTION RECTIFIER AND SYNTHETIC DIAMOND BEARING ASSEMBLIES

CROSS-REFERENCE TO RELATED APPLICATIONS

This application is a continuation-in-part to U.S. patent application Ser. No. 16/153,265, entitled "FLUID-POWERED LINEAR MOTOR WITH ROTARY PISTONS AND MOTION RECTIFIER," by David W. Raymond, filed Oct. 5, 2018, which claims priority to provisional patent application U.S. Ser. No. 62/569,074, entitled "FLUID-POWERED LINEAR MOTOR WITH ROTARY PISTONS AND MOTION RECTIFIER," by David W. Raymond, filed Oct. 6, 2017, the disclosures of which are incorporated herein by reference in their entireties.

STATEMENT REGARDING FEDERALLY SPONSORED RESEARCH OR DEVELOPMENT

This invention was developed under Contract No. DE-NA0003525 between the United State Department of Energy and National Technology & Engineering Solutions of Sandia, LLC, for the operation of the Sandia National Laboratories.

BACKGROUND OF THE INVENTION

The present invention relates to the field of motors, and specifically to fluid-powered linear motors with rotary pistons for drilling.

Downhole drills are used for oil drilling, geothermal drilling, and other deep earth penetration applications. Downhole drills include rotary and percussive drills. For nearly any drilling method, rotational energy must be transferred downhole in order to promote rock reduction. The drill bit may be rotated by an electric motor or fluid/hydraulic system. The rotating action can be produced either at the surface or near the drill bit. In addition to rotational cutting, drills may also be pressurized or mechanically actuated to force the drill bit to hammer against the rock/earth. Prior art rotation systems and methods are complex, require large form factors to create sufficient torque, and require a high degree of maintenance.

The most common method of downhole energy transfer is rigid drill pipe. The drill pipe is rotated from the surface, with drilling joints added for tripping (moving in and out of the hole). For this type of system, the entire drill string rotates. Typically, a rotary table system or a top drive is used to drive the drill string. Although it is well suited for vertical drilling, it has limited applications in directional drilling because the drill string curvature and thrust loads generate additional torque that the surface based motor must overcome and drill pipe survive.

Downhole techniques used to generate rotation such as positive displacement motors (PDMs) are limited in their temperature range due to the use of elastomers. Energy resources like geothermal and deep oil and gas wells lie in hot (160° C.-300° C.), and often hard rock. The high-temperatures limit the use of PDMs in those environments. Additionally, while PDM motors are used for the vast majority of directional drilling operations, they introduce significant lateral vibration to the drilling assembly as the multi-lobed helical rotor comprising the power section undergoes nutation within the motor housing to generate rotor rotation. This lateral vibration is detrimental to both hardware life and directional drilling operations.

U.S. Pat. No. 9,447,798 discloses a motor that includes a module assembly incorporating an axially-cycled piston. The piston axial motion is torque coupled to convert the axial motion into rotary motion. The method does not require elastomers for operation and the rotor operates concentrically thereby not inducing lateral vibration. A modular fluid powered linear piston motor with harmonic coupling is described in U.S. patent application Ser. No. 15/090,282 filed Apr. 4, 2016, entitled "Modular Fluid Powered Linear Piston Motors with Harmonic Coupling", and includes a drive train to convert reciprocating motion from a piston into rotary motion in an output shaft. Rotation is accomplished with roller balls captured between an inner race and a drive liner to facilitate rotation between a rotor and a stator. These roller balls must operate with low friction to enable smooth operation of the motor. Additionally, they must operate under a high contact load as they are in the preloaded and active load path to transmit torque to the output rotor. Finally, they must potentially operate with an abrasive drilling fluid under the rigors of high ambient temperatures and high friction conditions.

The limitations of these configurations are: 1) many pistons are required to generate the requisite torque to drive a drill bit downhole, and 2) any particulates in the drilling fluid would potentially settle out on the upper surfaces of the piston and eventually restrict operation.

What is needed are systems and/or methods that overcome one or more of these limitations or provides other advantageous features.

Other features and advantages will be made apparent from the present specification. The teachings disclosed extend to those embodiments that fall within the scope of the claims, regardless of whether they accomplish one or more of the aforementioned needs.

SUMMARY OF THE INVENTION

According to an embodiment of the disclosure, a motor module is disclosed that includes a primary rotor assembly comprising a harmonic drive rotor;
  a secondary reciprocating rotor assembly coupled to the primary rotor assembly, the
  secondary reciprocating rotor assembly comprising a reciprocating rotary piston assembly and a helical drive screw;
  a helical drive reciprocating ring coupled to the helical drive screw; and
  a harmonic drive reciprocating ring coupled to the helical drive reciprocating ring and the harmonic drive rotor so that reciprocating motion of the secondary reciprocating rotor assembly imparts linear motion to the helical and harmonic reciprocating rings so that the harmonic reciprocating ring rotates the harmonic drive rotor to impart continuous rotary motion to the primary motor assembly; and
  one or more synthetic diamond bearings to support radial and thrust loads and combinations thereof within the assembly.

According to another embodiment of the disclosure, a motor is disclosed that includes two or more motor modules, wherein each of the two or more motor modules includes a primary rotor assembly comprising a harmonic drive rotor, a secondary reciprocating rotor assembly coupled to the primary rotor assembly, the secondary reciprocating rotor assembly comprising a reciprocating rotary piston assembly and a helical drive screw, a helical drive reciprocating ring coupled to the helical drive screw, and a harmonic drive reciprocating ring coupled to the helical drive reciprocating ring and the harmonic drive rotor so that reciprocating motion of the secondary reciprocating rotor assembly imparts linear motion to the helical and harmonic reciprocating rings so that the harmonic reciprocating ring rotates the harmonic drive rotor to impart continuous rotary motion to the primary motor assembly, and one or more synthetic diamond bearing assemblies to support radial and thrust loads and combinations thereof within the motor.

According to another embodiment of the disclosure, a method for converting fluid energy to rotational energy is disclosed that includes providing fluid to a motor module comprising a primary rotor assembly comprising a harmonic drive rotor, diverting a portion of the fluid to a secondary reciprocating rotor assembly coupled to the primary rotor assembly, the secondary reciprocating rotor assembly comprising a reciprocating rotary piston assembly, energizing the reciprocating rotary piston assembly with the portion of the fluid to reciprocatedly rotate the secondary reciprocating rotor assembly, and transferring energy from the secondary reciprocating rotor assembly to the primary rotor assembly via a mechanical rectifier to continuously rotate the primary rotor assembly, and using one or more synthetic diamond bearings to reduce friction between the reciprocation of the secondary reciprocating rotor assembly with respect to the continuous rotation of the primary rotor assembly.

One advantage of the present disclosure are motors having improved torque characteristics.

Another advantage of the present disclosure are motors that do not introduce lateral vibration to a drilling assembly.

Another advantage of rotary pistons is the drilling fluid is allowed to flow through the power section and is thereby immune to particulates settling on the piston lands.

Another advantage is that preferential torque and speed characteristics may be prescribed by specification of design parameters governing the operation of the rotary piston/helical drive screw/harmonic drive combination comprising the assembly.

Another advantage is use of synthetic diamond bearing assemblies that allows motor operation with abrasive drilling fluids to power the motor. Synthetic diamond bearing assemblies are heralded for their low friction operation under high loads.

Alternative exemplary embodiments relate to other features and combinations of features as may be generally recited in the claims.

BRIEF DESCRIPTION OF THE DRAWINGS

FIG. 6 illustrates a harmonic drive reciprocating ring according to an embodiment of the disclosure.

FIG. 9A is an illustration of cut away 1-1 of the motor module of FIG. 9.

FIG. 9B is an illustration of cut away 2-2 of the motor module of FIG. 9.

FIG. 9C is an illustration of cut away 3-3 of the motor module of FIG. 9.

FIG. 9D is an illustration of cut away 4-4 of the motor module of FIG. 9.

FIG. 9E is an illustration of cut away 5-5 of the motor module of FIG. 9.

FIG. 9F is an illustration of cut away 6-6 of the motor module of FIG. 9.

FIG. 9G is an illustration of cut away 7-7 of the motor module of FIG. 9.

FIG. 9H is an illustration of cut away 8-8 of the motor module of FIG. 9.

FIG. 22 is an illustration of a tapered bearing assembly according to an embodiment of the disclosure.

The application will become more fully understood from the following detailed description, taken in conjunction with the accompanying figures.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

The present disclosure is directed to systems and methods that use motors with rotary pistons and reciprocating linear rings to rectify reciprocative rotary motion to continual rotary motion to improve torque over axial piston configurations. The torque generated by the rotational pistons is proportional to the length of the rotary pistons; hence the pistons can be prescribed of the length necessary to generate a desired torque. Furthermore, an increased number of pistons may be used for greater torque. The form factor presented by rotational pistons allows flow through the piston section so fluid particulates will not settle out within the piston assembly. The disclosed motors have improved torque and particle settling characteristics and do not introduce lateral vibration and can operate at high temperatures. Further, the disclosed motors allow operation with abrasive drilling fluids pumped downhole to power the motor by virtue of integration of synthetic diamond bearing assembles between motor components subject to relative motion.

Figure 1:
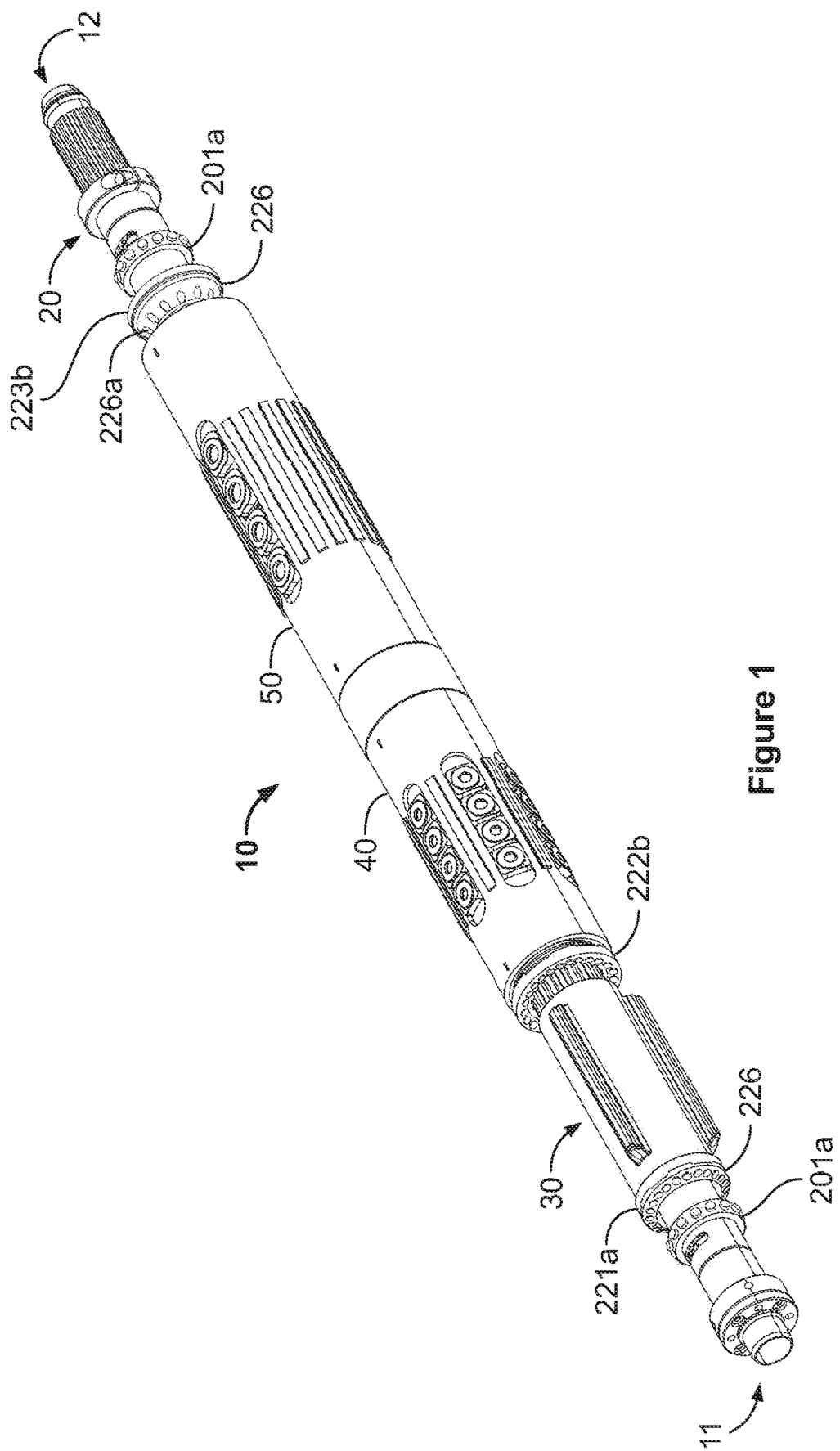
FIG. 1 illustrates an internal power section portion of a fluid-powered linear motor module incorporating synthetic diamond bearing assemblies according to an embodiment of the disclosure.

FIG. 1 illustrates an internal power section 10 of a fluid-powered linear motor module (internal power section) 10 according to an embodiment of the disclosure. As can be seen in FIG. 1, the internal power section 10 includes a primary rotor assembly 20, a secondary reciprocating rotor assembly 30, a helical drive reciprocating ring (helical drive ring) 40 and a harmonic drive reciprocating ring (harmonic drive ring) 50. Additional components not seen are discussed in further detail below. The internal power section 10 has aft end or fluid inlet 11 and a fore end or fluid outlet 12. The internal power section 10 receives fluid at the aft end that drives the secondary reciprocating rotor assembly that drives the helical and harmonic reciprocating rings to drive a harmonic drive rotor (described below) attached to the primary rotor assembly to impart a continual rotation thereto, the fluid discharged thereafter from the fluid outlet.

Figure 20:
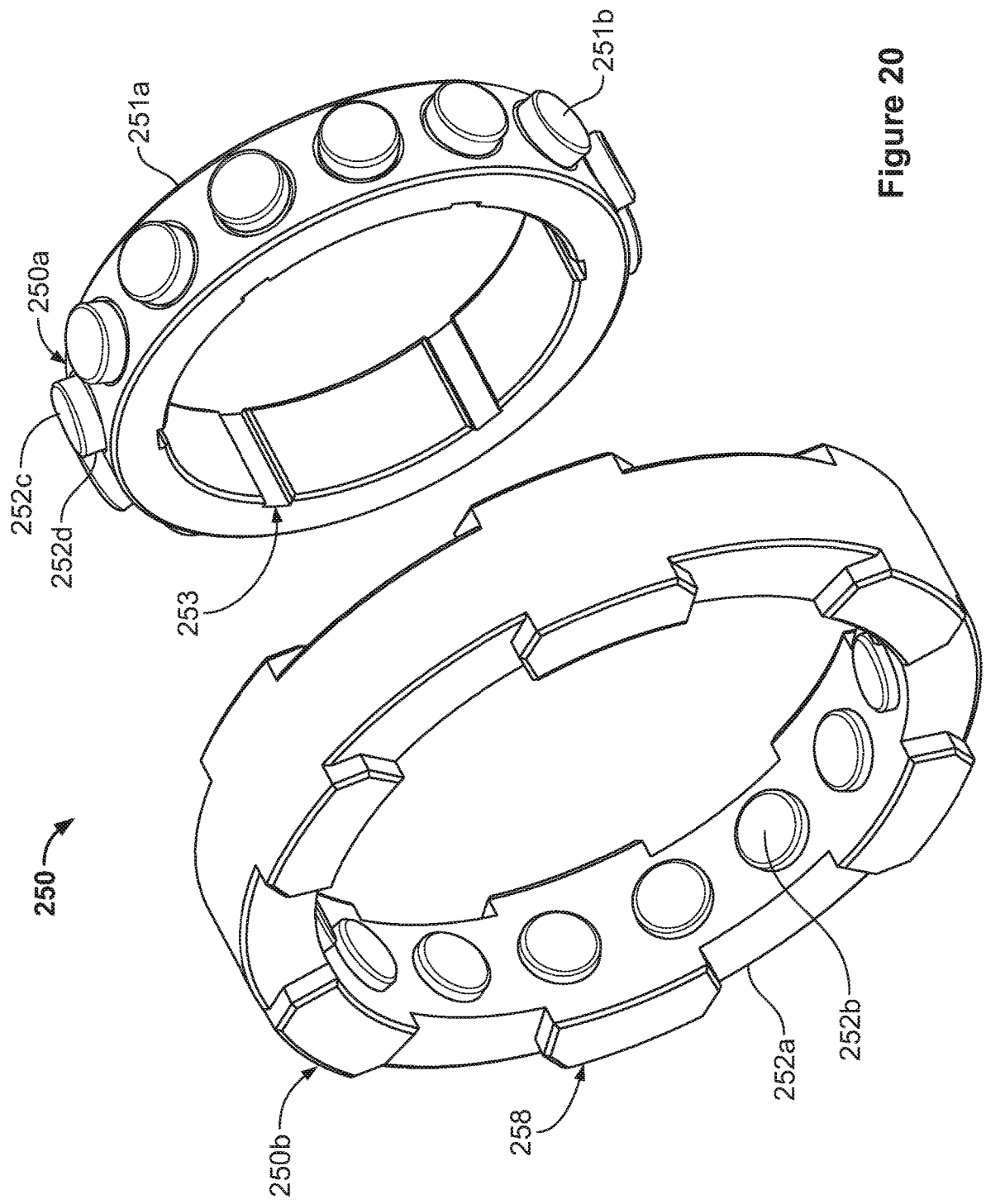
FIG. 20 is an illustration of a radial bearing assembly according to an embodiment of the disclosure.

As can further be seen in FIG. 1, the internal power section 10 further includes radial bearing inner races 201a disposed at opposite ends of the internal power section 10. Corresponding radial bearing outer races 201b can be seen in FIG. 7A. The combination of radial bearing inner and outer races 201a, 201b is referred to a radial bearing assembly or radial bearing. Radial bearings 201 formed by inner and outer races 201a and 201b are shown FIG. 8. An embodiment of a radial bearing 250 including a radial bearing inner race 250a and outer race 250b is shown in FIG. 20 and is described in the accompanying text to FIG. 20.

As can also be further seen in FIG. 1, the internal power section 10 further includes tapered bearing races 221a, 222b and 223b. Corresponding tapered bearing races 221b, 222a and 223a can be seen in FIG. 7A. In this disclosure with respect to radial and tapered bearings, "a" refers to an inner race configuration and "b" refers to an outer race configuration. The combination of tapered bearing inner and outer races 221a and 221b, 222a and 222b, and 223a and 223b, respectively, is referred to as a tapered bearing assembly or tapered bearing. Tapered bearings 221, 222, and 223 formed by inner and outer races are shown in FIG. 8. An embodiment of tapered bearing 270 including a tapered bearing inner race 270a and a tapered bearing outer race 270b is shown in FIG. 22.

As can also be seen in FIG. 1, flanges 226 are positioned adjacent tapered bearing inner and outer races 221a and 223b. A flange is also adjacent to the fore side of tapered bearing outer race 222b but cannot be seen in FIG. 1. The flanges 226 provide an interface from the primary rotor 20 to the tapered bearing race for reacting thrust loads within the rotor to the liner 72 shown in FIG. 8. In addition, one or more of the flanges 226, as well as other flanges disposed adjacent inner and outer tapered bearings, radial bearings, and thrust bearings may be included. In this embodiment, flanges 226 have fluid ports 226a that enable the working fluid to flow across the bearing assembly to provide cooling. In other embodiments, one or more flanges may have fluid ports 226a.

Figure 2:
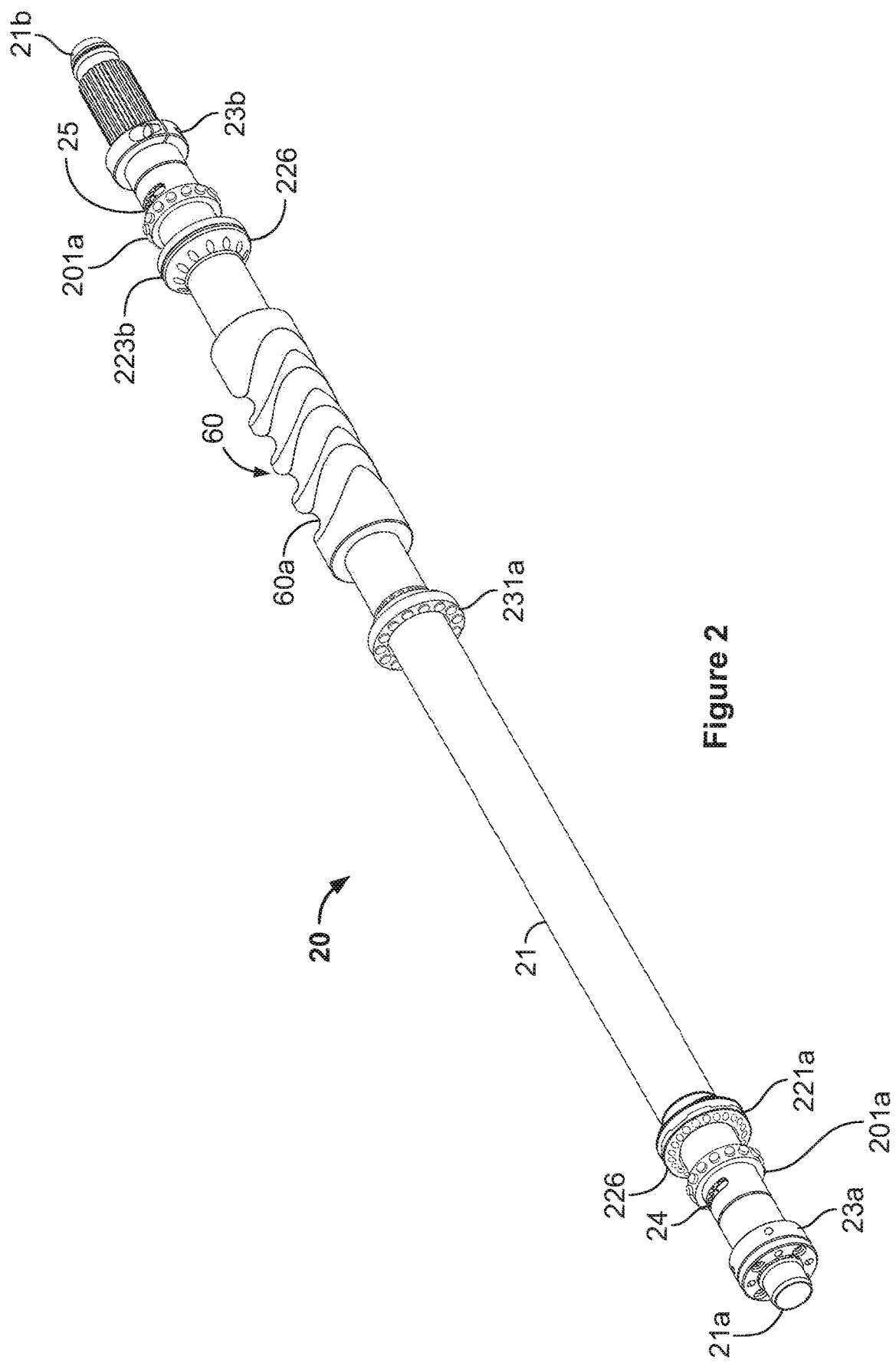
FIG. 2 illustrates a primary rotor assembly and harmonic drive rotor disposed thereupon incorporating synthetic diamond bearing assemblies according to an embodiment of the disclosure.

FIG. 2 illustrates a primary rotor assembly 20 and harmonic drive rotor 60 according to an embodiment of the disclosure. The primary rotor assembly 20 ports the fluid to the piston chambers, identified and discussed below, as it rotates. The primary rotor assembly 20 produces torque in response to the harmonic drive ring 50 moving across the harmonic drive rotor 60. The primary rotor assembly 20 includes a primary rotor shaft 21, flanges 226 and end retainers 23a, 23b. The end retainers 23a, 23b retain the various components comprising the subassembly on the primary rotor shaft. The first end retainer or locknut 23a is disposed on the shaft 21 proximate the fluid inlet 21a and a second end retainer or shaft collar 23b is disposed proximate the fluid outlet 21b.

The primary rotor assembly 20 also includes a primary shaft fluid outlet (pressure) valve 24 and a primary shaft fluid inlet (exhaust) valve 25. In addition, the primary rotor assembly 20 includes a thrust bearing first race 231a that mates with a thrust bearing second race 231b on the secondary reciprocating rotor assembly 30 in FIG. 3. In contrast to "a" and "b" referring to inner and outer bearing races for radial and tapered bearings, thrust bearing races "a" and "b" refers to each race of a race pair as the races oppose one another in contrast to overlap as in radial and tapered bearings. The combined rotor assembly 70 is shown in FIG. 4 with the first and second races 231a, 231b combined to form thrust bearing 231. The thrust bearing 231 allows axial loads from the reciprocation of the secondary reciprocating rotor assembly 30 to be supported by the primary rotor assembly 20. A thrust bearing 260 including thrust bearing first and second races 260a, 260b can be seen in FIG. 21 and is described in the accompanying text to FIG. 21.

The primary shaft fluid outlet valve 24 allows a portion of the fluid entering the shaft fluid inlet 21a and flowing through a shaft internal pressurized flow channel (not shown), which flows between the primary shaft fluid inlet 21a and the primary shaft fluid outlet 21b, to exit the shaft internal pressurized flow channel and drive the secondary reciprocating rotor assembly 30. The primary fluid inlet valve 25 allows the fluid that has driven the secondary reciprocating rotor assembly 30 to return to a shaft internal flow channel separate from the pressurized fluid flowing through the shaft internal pressurized flow channel. Both the pressurized fluid flowing through the shaft internal pressurized flow channel and the fluid that has performed work by driving the secondary reciprocating rotor assembly 30 are discharged as separate streams at the shaft fluid outlet 21*b*.

The harmonic drive rotor 60 is a cylindrical sleeve that has ball track grooves 60*a* that allow seating of ball transfers in harmonic drive reciprocating ring 50. The ball track grooves 60*a* form a recirculating path around the harmonic drive to convert harmonic, cycloidal or polynomial motion in the harmonic drive reciprocating ring 50 to rotary motion in the primary rotor assembly. The harmonic drive rotor 60 converts reciprocating motion in the harmonic drive reciprocating ring 50 to continuous rotary motion in primary rotor assembly 20. The harmonic drive rotor 60 is joined to, affixed or otherwise attached to the primary rotor assembly 20 so that imparting rotation to the harmonic drive rotor 60 imparts rotation to the primary rotor assembly 20.

Figure 3:
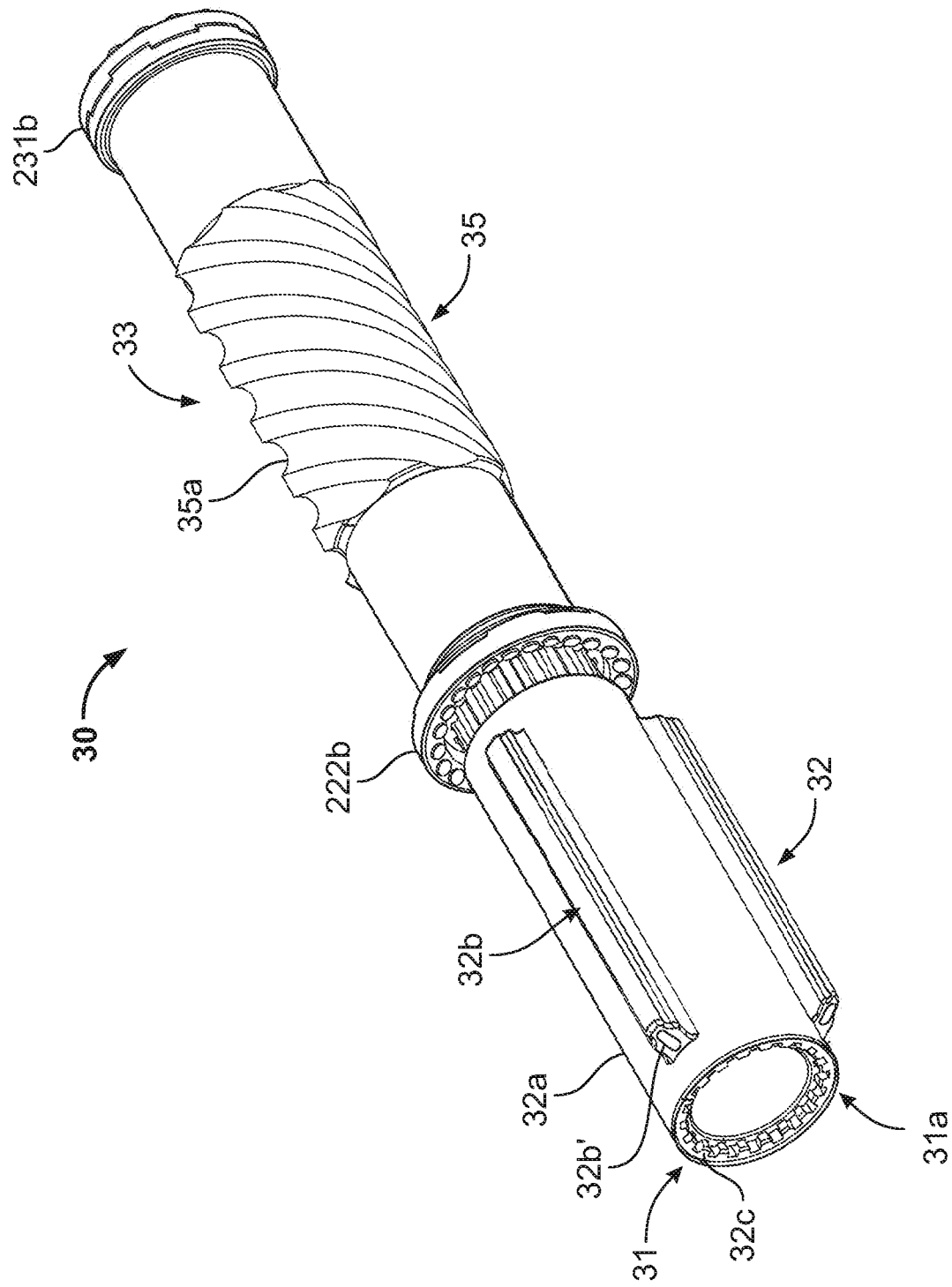
FIG. 3 illustrates a secondary rotor assembly incorporating synthetic diamond bearing assemblies according to an embodiment of the disclosure.
Figure 4:
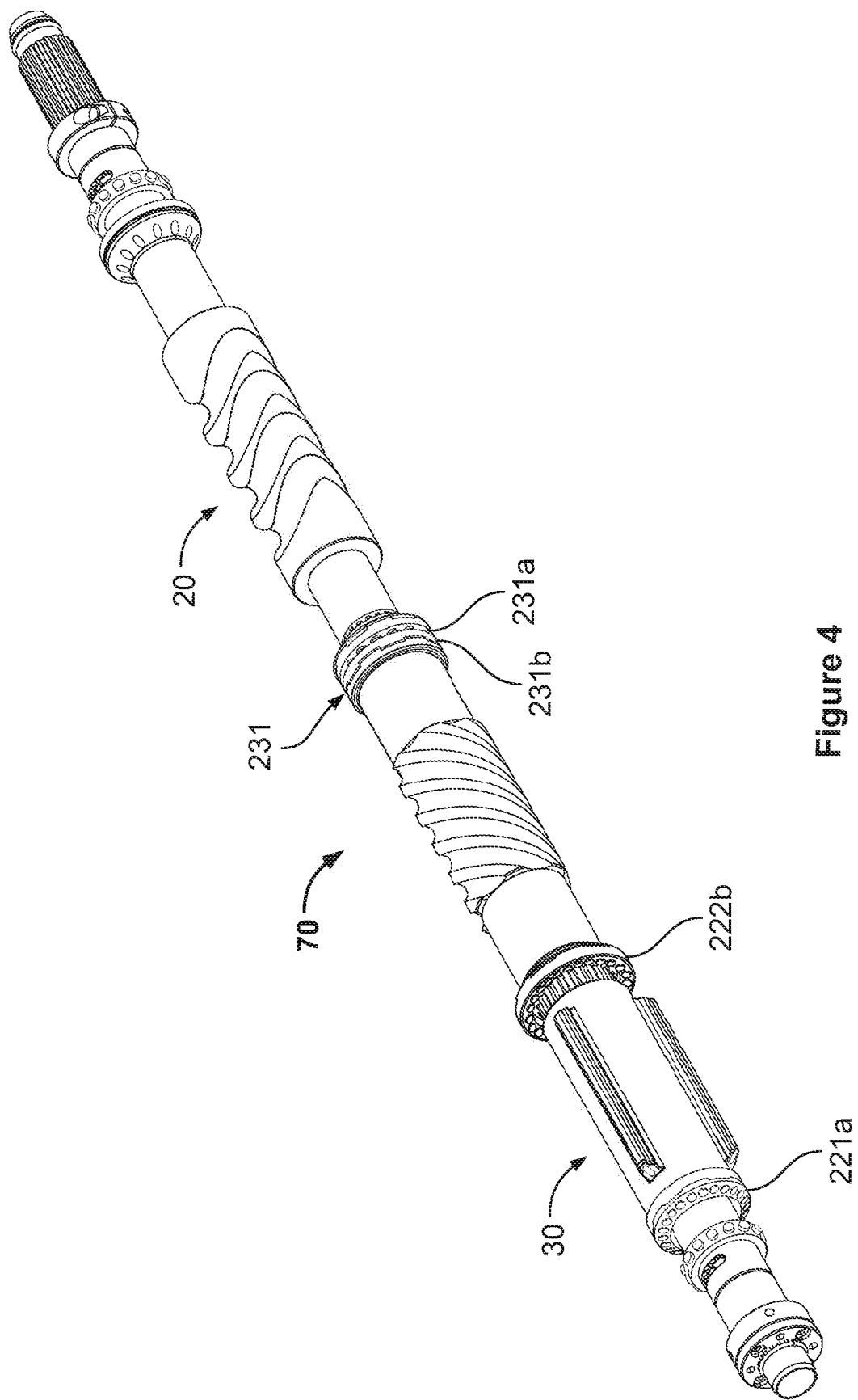
FIG. 4 illustrates a composite rotary assembly incorporating synthetic diamond bearing assemblies according to an embodiment of the disclosure.

FIG. 3 illustrates a secondary reciprocating rotor assembly 30 according to an embodiment of the disclosure. The secondary reciprocating rotor assembly 30 is concentric to the primary rotor assembly 20 and can reciprocatedly rotate thereabout. The secondary reciprocating rotor assembly 30 includes a secondary reciprocating rotor (secondary rotor) 31, a reciprocating rotary piston assembly 32, and a helical drive screw assembly 33. The reciprocating rotary piston assembly 32 includes a housing 32*a*, reciprocating rotary motor blades or pistons 32*b* and splines 32*c* internal to the housing 32*a*. The reciprocating rotary piston assembly 32 shows an end view of the secondary rotor 32 so as to show secondary rotor splines 31*a* that engage with the splines 32*c* of the reciprocation rotary piston assembly 32. In this exemplary embodiment, the reciprocating rotary piston assembly 32 includes three blades or pistons 32*b*, in other embodiments, the assembly 32 may have one or more pistons. In another embodiment, the assembly 32 may have two or more pistons 32*b*.

As can be seen in FIG. 3, the pistons 32*b* include synthetic diamond inserts 32*b'* at each end of a piston for reduced friction and abrasive drilling fluid compatibility (inserts 32*b'* on the fore end hidden from view in this figure). The inserts are nearly surface flush with the pistons 32*b* to prevent fluid leaking from the high pressure chamber to the low pressure chamber. Inserts 32*b'* mate to races 79*d* shown in FIG. 7A. The synthetic diamond inserts 32*b'* contact races 79*d* shown in FIG. 7A and together comprise a tapered bearing assembly type of assembly.

Figure 21:
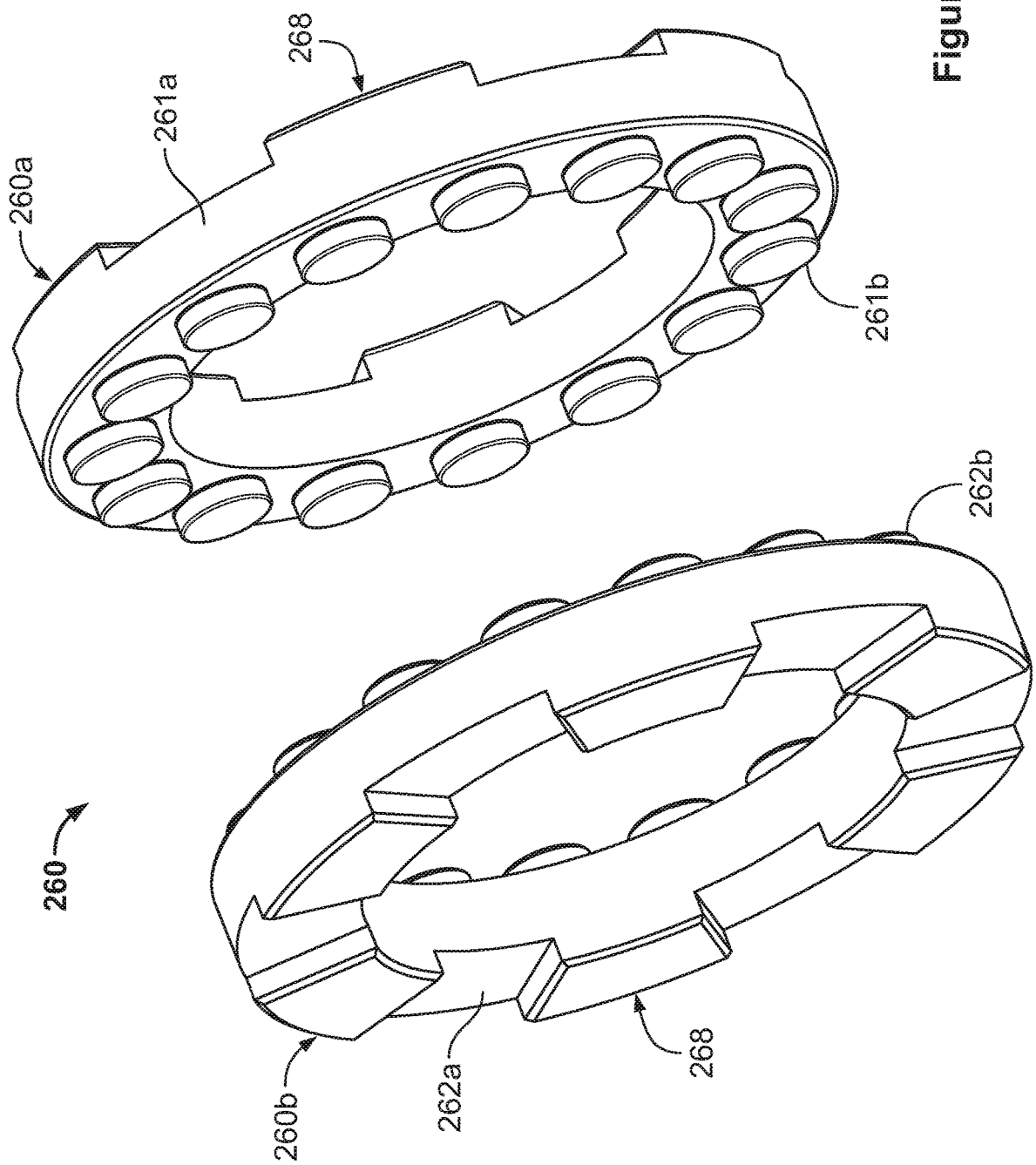
FIG. 21 is an illustration of a thrust bearing assembly according to an embodiment of the disclosure.

The thrust bearing race 231*b* on the secondary rotor (FIG. 3) reacts thrust load from the helical drive reciprocating ring 40 to the thrust bearing race 231*a* on the primary rotor (FIG. 2); the composite assembly is shown in FIG. 4. An embodiment of a thrust bearing 260 including a thrust bearing inner race 260*a* and outer race 260*b* is shown in FIG. 21 and is described in the accompanying text to FIG. 21. As discussed above, thrust bearing 231 is formed by first and second races 231*a* and 231*b* as shown on FIG. 4. Use of low friction bearings facilitates the reciprocation of secondary reciprocating rotor assembly 30 with respect to the continuous rotation of primary rotor assembly 20.

Radial bearings 201, tapered bearings 221, 222, and 223 and thrust bearing 231 (FIG. 4) include synthetic diamond inserts for reduced friction and abrasive drilling fluid compatibility as discussed in more detail in the general discussion of radial, thrust and tapered bearings regarding FIGS. 20, 21 and 22.

The helical drive screw 35 is a cylindrical sleeve that has ball track grooves 35*a* that allow seating of ball transfers 45 (see FIGS. 5 and 5A) in helical drive reciprocating ring 40. The ball track grooves 35*a* form a non-recirculating path around the helical drive to convert reciprocating rotary motion in the secondary rotor assembly to reciprocating motion in the helical drive reciprocating ring 40.

FIG. 4 illustrates a composite rotary assembly 70 according to an embodiment of the disclosure. As can be seen in FIG. 4, the composite rotary assembly 70 is formed by concentrically assembling the secondary reciprocating rotor assembly 30 and the primary rotor assembly 20. The secondary reciprocating rotor assembly 30 is positioned longitudinally on the primary rotor assembly 20 by abutting thrust bearing second race 231*b* against thrust bearing first race 231*a*, resulting in thrust bearing 231.

Figure 5:
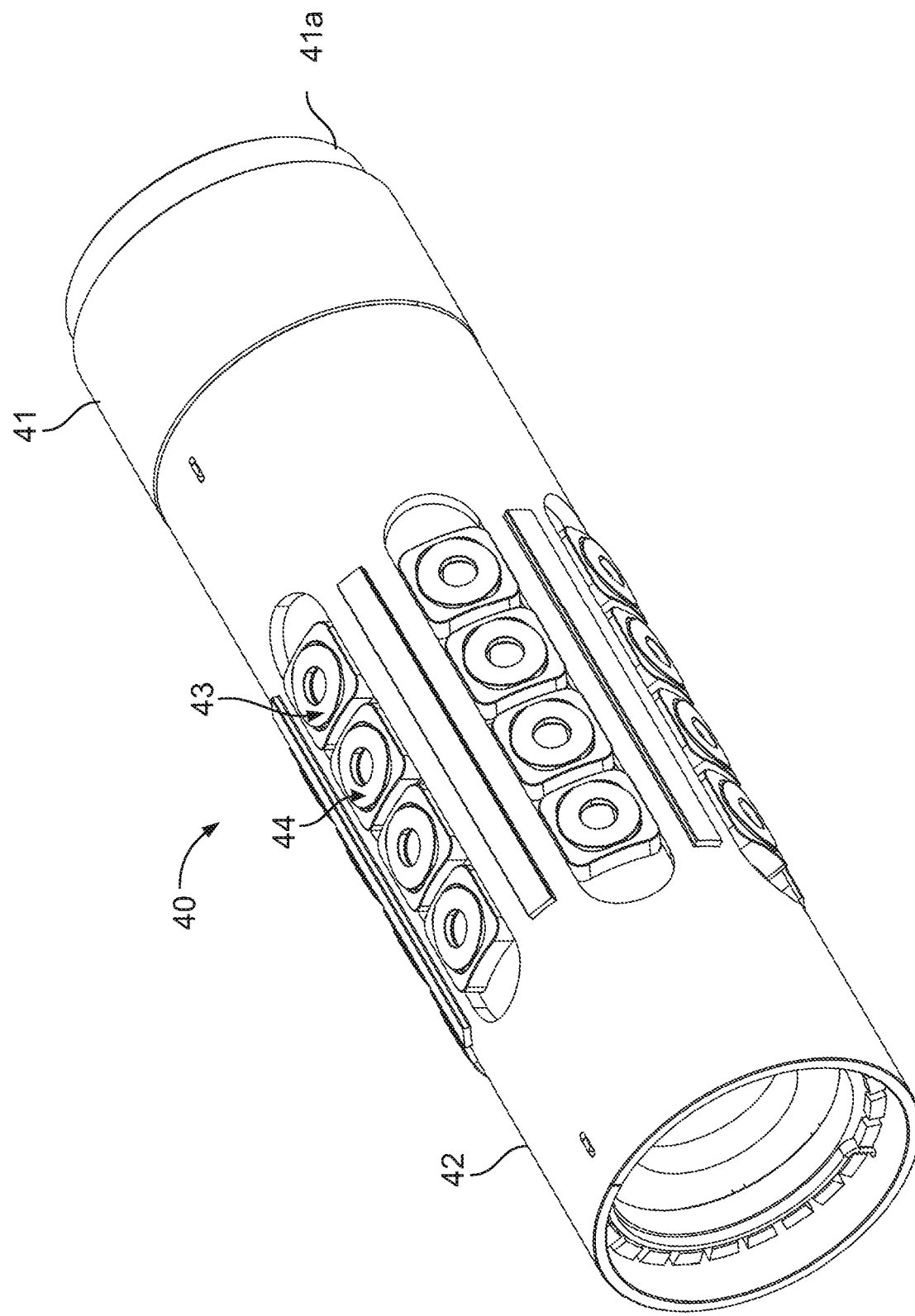
FIG. 5 illustrates a helical drive reciprocating ring and connecting flange according to an embodiment of the disclosure.
Figure 5A:
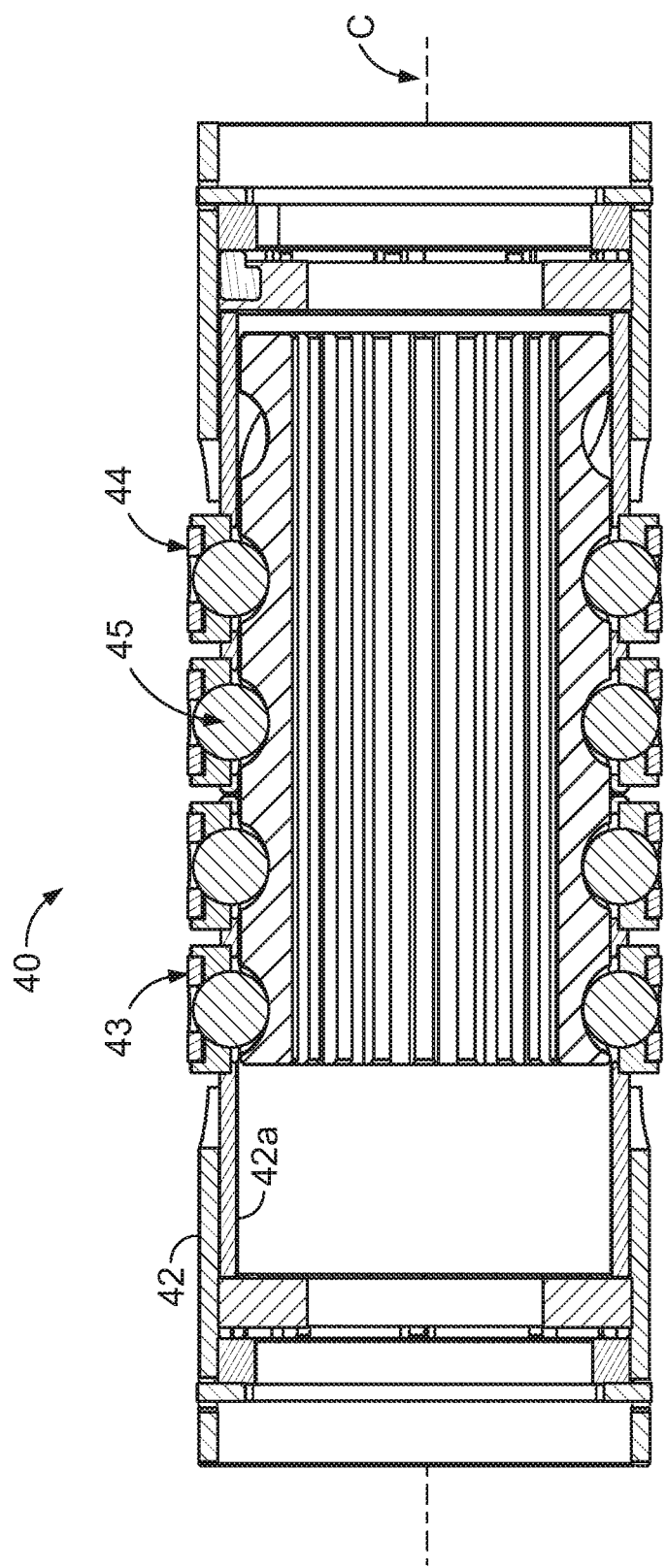
FIG. 5A is a cross section view of the helical drive reciprocating ring and connecting flange of FIG. 5.

FIGS. 5 and 5A illustrate a helical drive reciprocating ring (helical drive ring) 40 and a connecting flange 41 according to an embodiment of the disclosure. The connecting flange 41 is a coupler between reciprocating ring assemblies 40, 50. As can be seen in FIGS. 5 and 5A, the helical drive ring 40 includes a housing 42 and a plurality of ball transfers 43. The plurality of ball transfers 43 include a plurality of ball transfer housings (ball housings) 44 and a plurality of track, roller balls (balls) 45 (see FIG. 5A) disposed within the plurality of ball transfer housings 44. The plurality of ball housings 44 contain the corresponding plurality of balls 45 so that a portion of the balls extends towards the axial centerline of the housing 42 beyond the inner wall 42*a* of the housing 42 and the plurality of ball housings 44 (see FIG. 5A). The connecting flange 41 includes an insert portion 41*a* that is used to rigidly connect the helical drive ring 40 to the harmonic drive ring 50. The connecting flange 41 also includes an opposing insert portion (not shown) disposed within and rigidly connected to the helical drive ring 40.

The helical drive ring 40 is disposed around and concentric to the helical drive screw assembly 33 (FIGS. 1, 3, 4). The plurality of balls 45 engage and track in corresponding track grooves 35*a* of the helical drive screw 35 (FIG. 1, 3, 4). In such a manner, the balls 45 and track grooves 35*a* are in load bearing contact and the balls 45 rotationally reciprocate in the ball housings 44 as the helical drive screw 35 reciprocates.

Figure 6A:
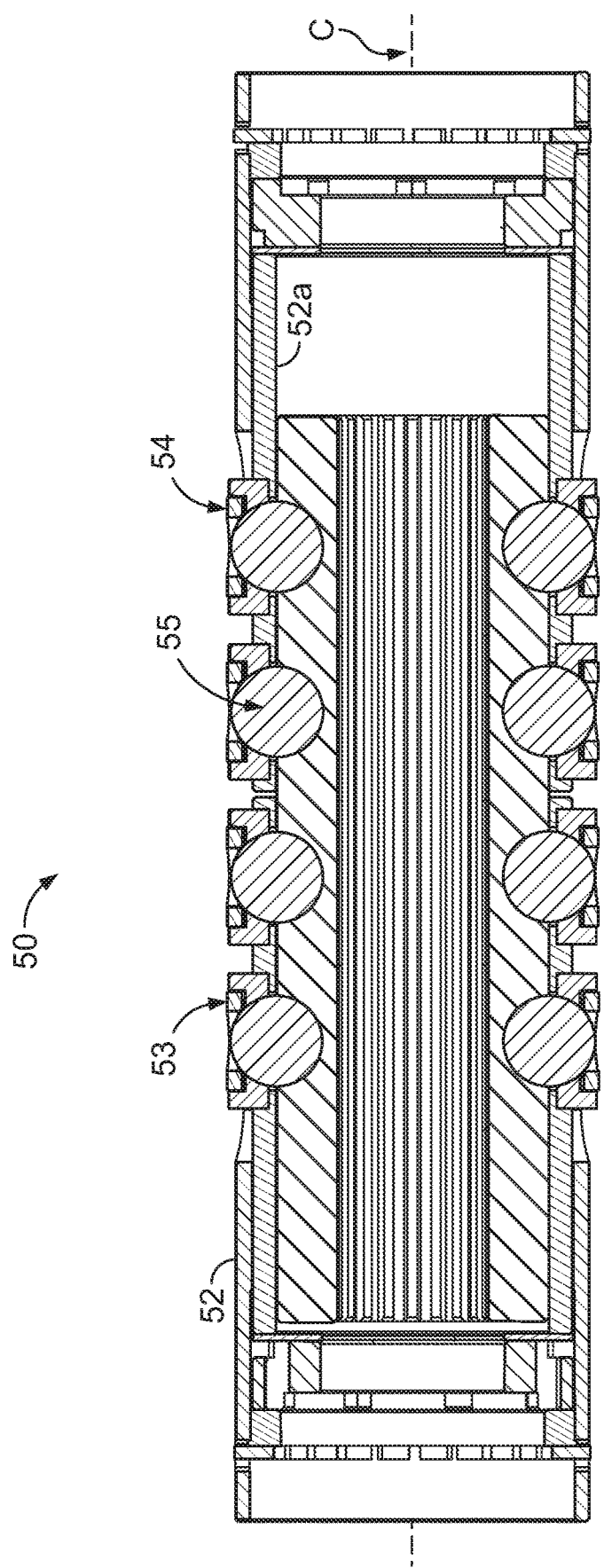
FIG. 6A is a cross section view of the harmonic drive reciprocating ring of FIG. 6.

FIGS. 6 and 6A illustrate a harmonic drive reciprocating ring (harmonic drive ring) 50 according to an embodiment of the disclosure. As can be seen in FIGS. 6 and 6A, the harmonic drive ring 50 includes a housing 52, a plurality of ball transfers 53 that include a plurality of ball transfer housings 54 and a plurality of track, roller balls (balls) 55 disposed within the plurality of ball transfer housings 54. The plurality of ball housings 54 contain the corresponding plurality of balls 55 so that a portion of the balls extend towards the axial centerline of the housing 52 beyond the inner wall 52*a* of the housing 52 and the plurality of ball housings 54.

The harmonic drive ring 50 is disposed around and concentric to the harmonic drive rotor 60 (FIGS. 2, 4). The plurality of balls 55 engage and track in corresponding harmonic track grooves 60*a* of the harmonic track rotor 60 (FIG. 2, 4). In such a manner, the balls 55 and harmonic track grooves 60*a* are in load bearing contact and the balls 55 rotate in the ball housings 54 as the harmonic drive rotor 60 rotates.

The helical drive ring 40 (see FIGS. 5 and 5B), the helical drive screw 35, the harmonic drive ring 50 (see FIGS. 6 and 6A), and the harmonic drive rotor 60 may be referred to as mechanical rectifier.

The ball transfers, and in particular, ball transfers with polycrystalline diamond bearing support, are the subject of co-owned U.S. patent application Ser. No. 15/726,506 entitled "BALL TRANSFER MECHANISM WITH POLYCRYSTALLINE DIAMOND BEARING SUPPORT," filed Oct. 6, 2017, incorporated by reference in its entirety.

Figure 7:
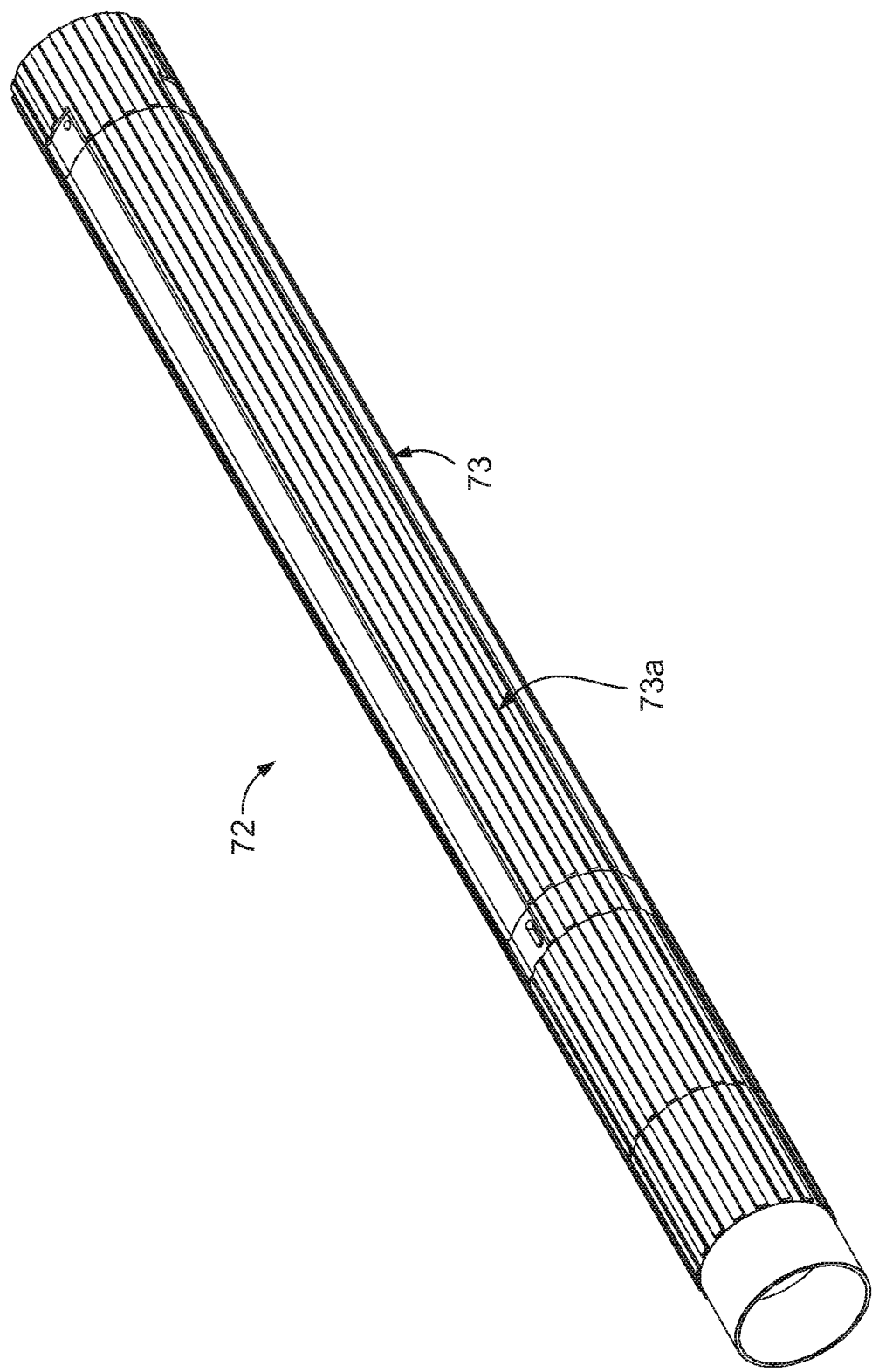
FIG. 7 illustrates a liner assembly according to an embodiment of the disclosure.
Figure 7A:
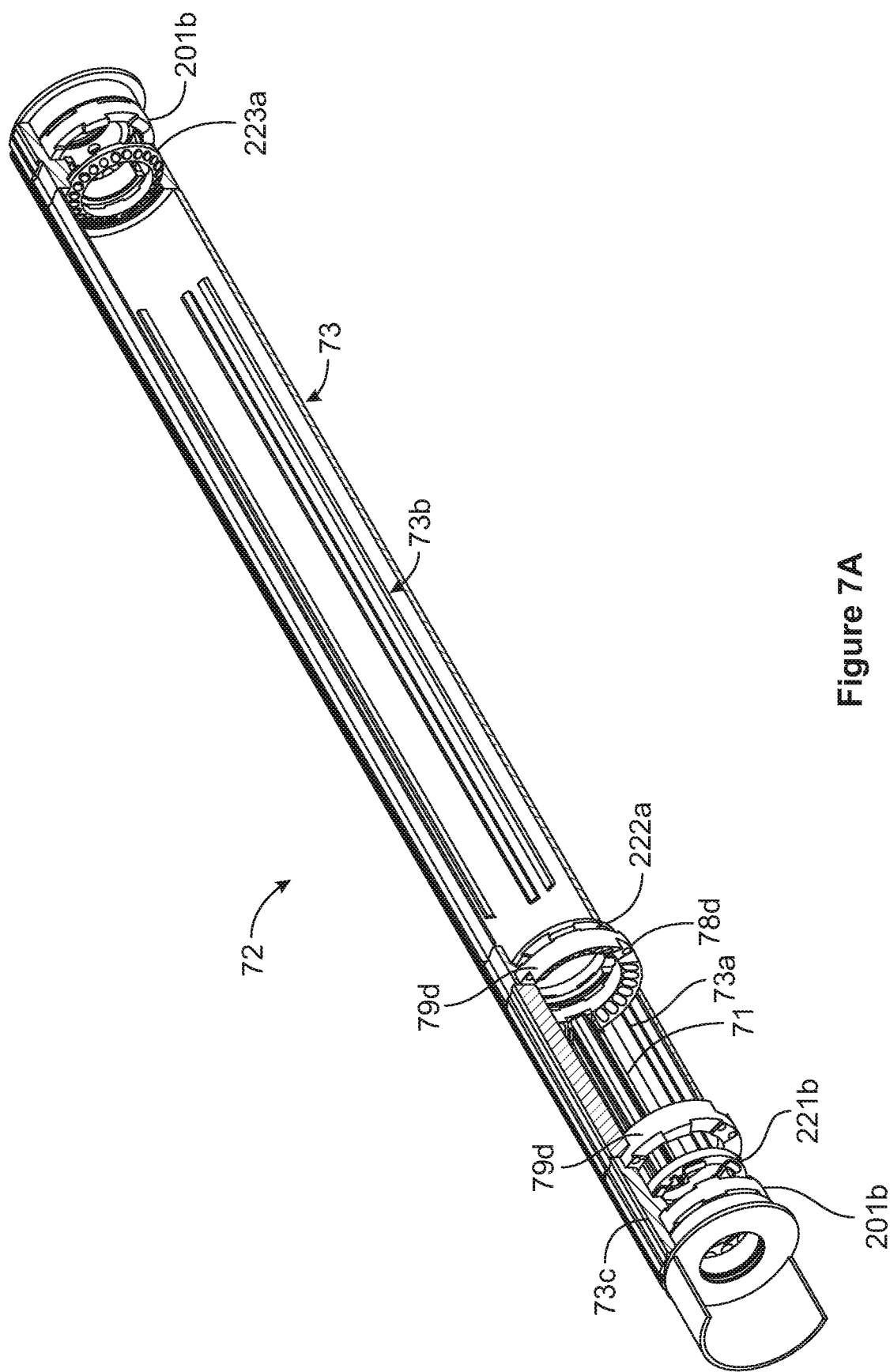
FIG. 7A is a cross section view of the liner assembly of FIG. 7 incorporating synthetic diamond bearing assemblies.
Figure 8:
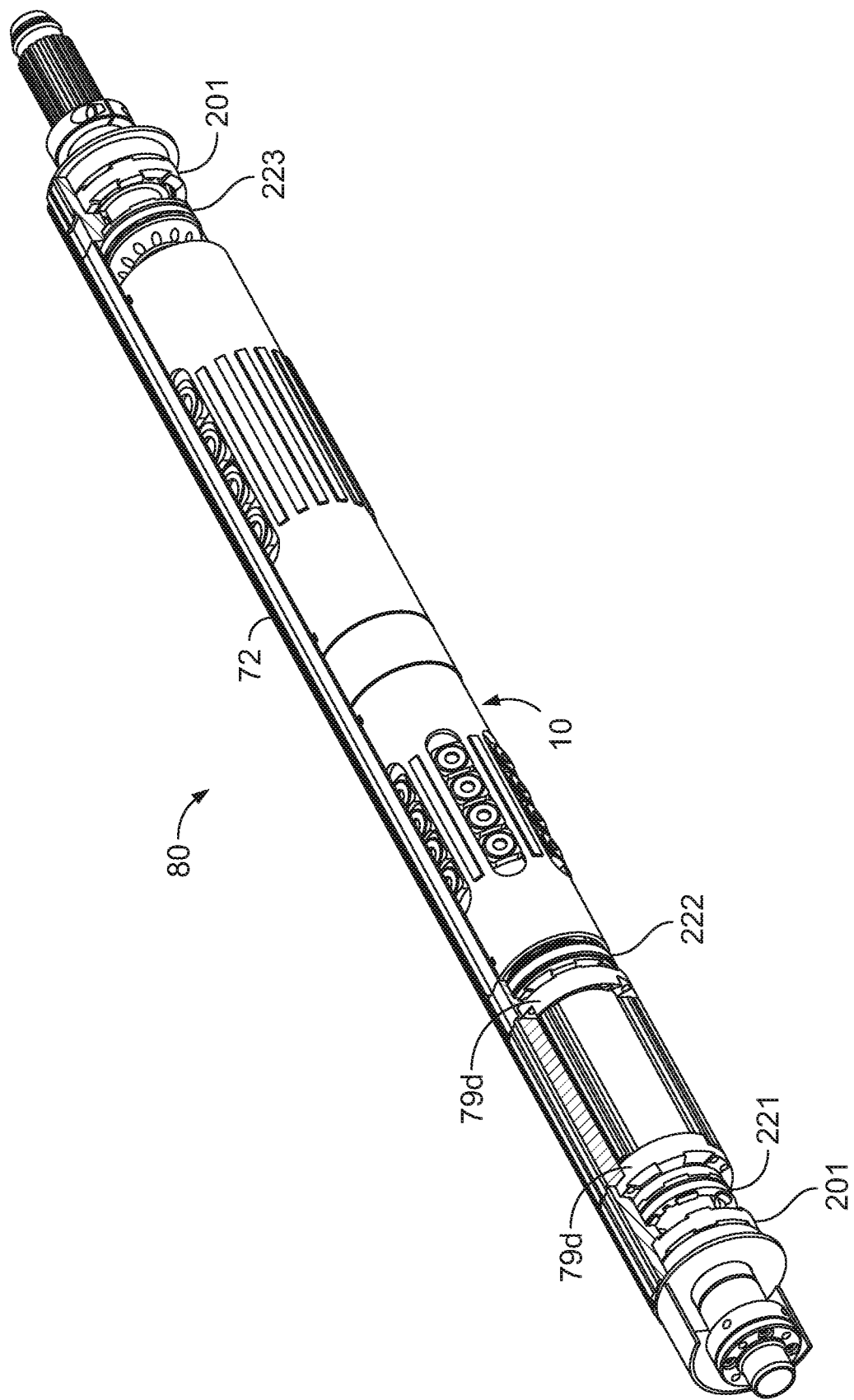
FIG. 8 is a partial cross section view of a motor module incorporating synthetic diamond bearing assemblies according to an embodiment of the disclosure with liner assembly cutaway.

FIGS. 7 and 7A illustrates a liner assembly (liner) 72 according to an embodiment of the disclosure. In this exemplary disclosure the liner 72 is formed from multiple segments for ease of assembly of the motor module 80 (see FIG. 8). In other embodiments, the liner 72 may be formed of one or more components. The liner 72 acts as a stator and forms the interface between the motor case (shell) and the rotor assembly shown in FIG. 4. As can be seen in FIGS. 7 and 7A, the liner 72 includes a housing 73 having external splines 73a and internal splines 73b. The external splines 73a engage with the motor case or shell 101 (see FIG. 10) to prevent rotation of the liner 72 as the liner 72 reacts the torque from the reciprocating rings (40, 50) on the interior surface using internal splines 73b to prevent the rings 40, 50 from rotating. Tapered bearing outer race 221b and tapered bearing inner races 222a, 223a are shown installed within the liner in FIG. 7A and act to react rotor thrust loads during operation. Also shown are races 79d that centralize the rotary piston during operation. As can be seen in FIG. 7A, races 79d include ports 78d that allow fluid ingress and egress from the rotary piston chambers that are described in detail in the following paragraphs. Also shown in FIG. 7A are rotary bearing outer races 201b and an annular ring at each end that retains the radial bearings within the assembly.

As can be seen in FIG. 7A, the liner 72 includes stator ribs 71 disposed there within. These stator ribs 71 interface with the rotary piston 32 to form cavities or chambers (e.g., chambers "A" & "B") that facilitate chamber pressurization in response to the following fluid pressurization sequence. As discussed in further detail below, adjacent rotary pistons 32 have a stator rib 71 disposed therebetween so as to divide the space therebetween into chambers "A and "B." The internal components 73c include ports to receive fluid from the pressure valve 24 and convey the fluid to the chambers as described in further detail below. It should be noted that internal components 73 are shown solid at the cut away but contain ports internal thereto.

FIG. 8 is a partial cross section view of a motor module 80 according to an embodiment of the disclosure with the liner 72 cutaway. The internal power section 10 shown in FIG. 1 is shown installed in the cut-away of the liner 72. The aforementioned first, second and third tapered bearings 221, 222 and 223, respectively and rotary bearings 201 (shown in FIGS. 1 and 7A, respectively) integrate the rotor assembly with the liner.

Radial bearings act to centralize the internal power section 10 within the liner assembly 72. Tapered bearings also centralize the internal power section 10 within the liner assembly 72 and react the axial force from the action of the helical drive reciprocating ring 40 and the harmonic drive reciprocating ring 50. A thrust bearing is used in the middle of the assembly as the rotor is centralized by the ball transfer housings 44 on the helical drive reciprocating ring 40 and the ball transfer housings 54 on the harmonic drive reciprocating ring 50. As shown in FIG. 8, there are two radial bearings 201 and three tapered bearings (221, 222 and 223).

A thrust bearing 231 is proximate the middle of the assembly 70 and is shown on FIG. 4, but not shown in FIG. 8.

Figure 9:
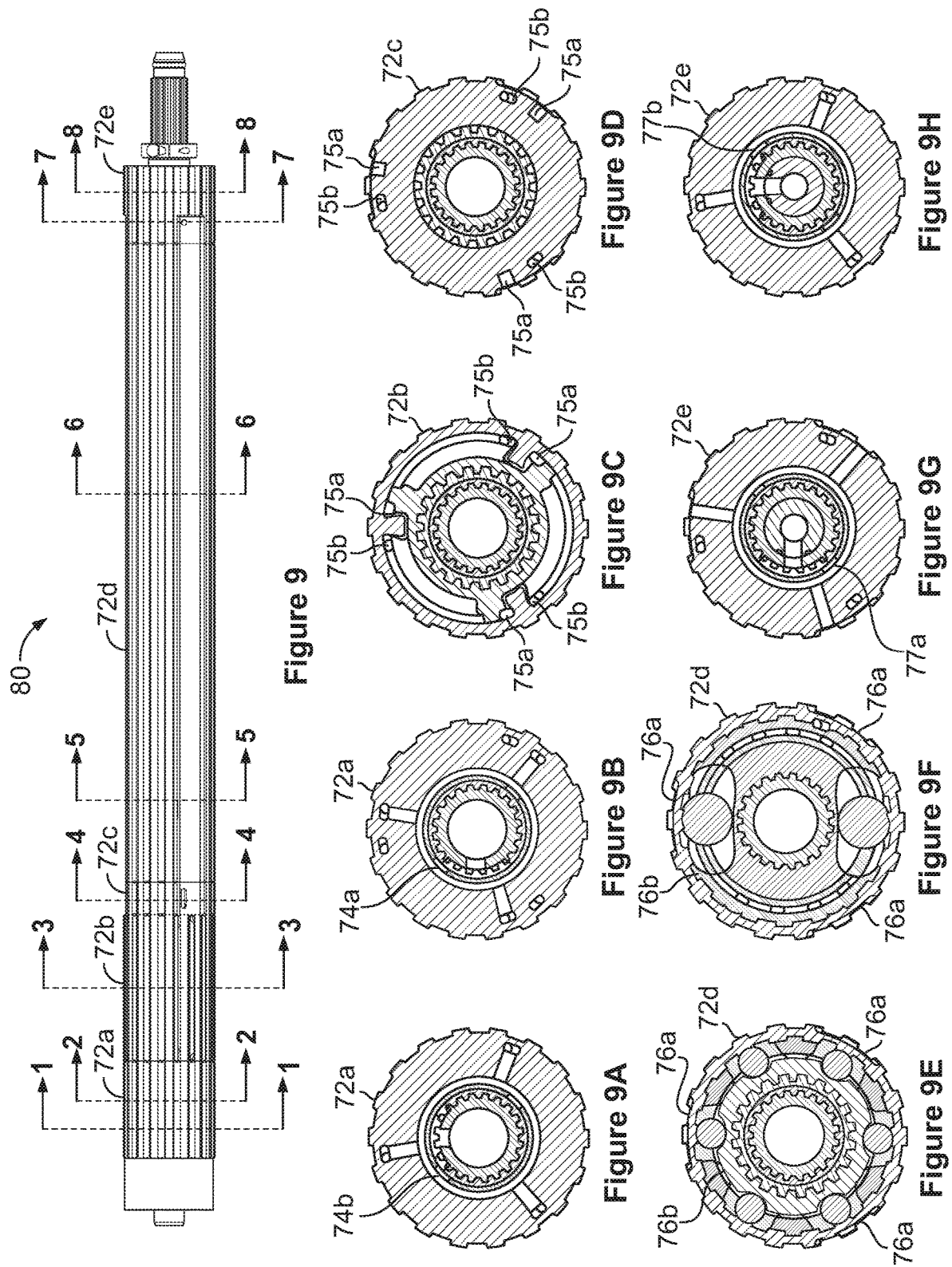
FIG. 9 is the motor module of FIG. 8 indicating cut aways for FIGS. 9A-9H.

FIG. 9 shows the complete motor module 80 with sectional references for FIGS. 9A-9H indicated. As can be seen in FIGS. 9A-9H, the liner 72a further includes fluid injection ports 74 (fluid injection port 74a—Chamber A, fluid injection port 74b—Chamber B) into rotary piston stator 72b, a fluid relief port 75 (fluid relief port 75a—Chamber A, fluid relief port 75b—Chamber B) in liner 72c, a fluid channel 76 (fluid relief port 76a—Chamber A—external to liner 72d, fluid relief port 76b—Chamber B—internal to liner 72d) and a fore fluid inlet port 77 (fluid relief port 77a—Chamber A, fluid relief port 77b—Chamber B in liner 72e). These are described below using the various sections through the motor module 80 in FIG. 9.

FIGS. 9A-9H shows how alternatively pressurizing and exhausting Chambers A and B impart reciprocative rotary motion to motor pistons to generate rotation and torque in the output rotor. As discussed below, Chamber A is pressurized while Chamber B is concurrently exhausted to energize the rotor assembly to impart clockwise motion to the rotary pistons to generate clockwise motion in the output rotor, followed by alternatively porting Chamber B to pressurize while Chamber A is concurrently exhausted to energize the rotor assembly to impart counter-clockwise motion to the rotary pistons to generate clockwise motion in the output rotor.

The fluid injection ports 74 receive fluid from the primary shaft fluid outlet (pressure) valve 24 (see FIG. 9A section 1-1 and 9B section 2-2) and port it to the rotary piston Chambers A and B (see FIG. 9C section 3-3). Fluid injection port 74a connects rotor primary shaft fluid outlet valve 24a to rotary piston Chamber A via flow through the liner 72a; fluid injection port 74b connects rotor primary shaft fluid outlet valve 24b to rotary piston Chamber B via flow through the liner 72a. These fluid injection ports 74a & 74b connect alternatively during rotor rotation to pressurize the chambers for rotary piston reciprocation. (Note the referenced figures show the beginning of Chamber A pressurization and completion of Chamber B pressurization corresponding to clockwise rotation of the rotor assembly.)

The fluid relief port 75 receives fluid from the rotary piston chambers (see FIG. 9C section 3-3) for ejection to the rotor primary shaft fluid inlet (exhaust) valve 25 via fluid channel 76 and fore fluid port 77. Fluid injection port 75a (see FIG. 9D section 4-4) connects rotor primary shaft fluid outlet valve 25 to rotary piston Chamber A via fluid channel 76a (described below) and fore fluid port 77a (described below); fluid injection port 75b connects rotor primary shaft fluid outlet valve 25 to rotary piston Chamber B via fluid channel 76b (described below) and fore fluid port 77b (described below). These fluid ejection ports 75a & 75b connect alternatively during rotor rotation to exhaust the chambers for rotary piston reciprocation.

The fluid channel 76a receives fluid from the fluid relief port 75 for ejection to the rotor primary shaft fluid inlet (exhaust) valve 25 via fore fluid port 77. Fluid injection port 76a, one or more cavities in the exterior of liner 72d (see FIG. 9E section 5-5 and 9F section 6-6) connects rotor primary shaft fluid outlet valve 25 to rotary piston Chamber A via fore fluid port 77a; fluid injection port 76b, flow across the helical drive reciprocating 40 (see FIG. 9E section 5-5) in the interior of liner 72d and harmonic drive reciprocating ring 50 (see FIG. 9F section 6-6) in the interior of liner 72d connects rotor primary shaft fluid outlet valve 25 to rotary piston chamber "B" via fore fluid port 77b. These fluid channels 76a & 76b connect alternatively during rotor rotation to exhaust the chambers for rotary piston reciprocation.

The fore fluid inlet port 77 receives fluid from the fluid channel 76 for ejection to the rotor primary shaft fluid inlet (exhaust) valve 25. Fore fluid inlet port 77a (see FIG. 9G section 7-7) connects rotor primary shaft fluid outlet valve 25 to rotary piston chamber "A" via fluid channel 76a and flow through the liner 72e; fore fluid inlet port 77b (see FIG. 9H section 8-8) connects rotor primary shaft fluid outlet valve 25 to rotary piston Chamber B via fluid channel 76b fluid injection port 76b and flow through the liner 72e. These fore fluid inlet ports 77a & 77b connect alternatively during rotor rotation to exhaust the chambers for rotary piston reciprocation.

Figure 10:
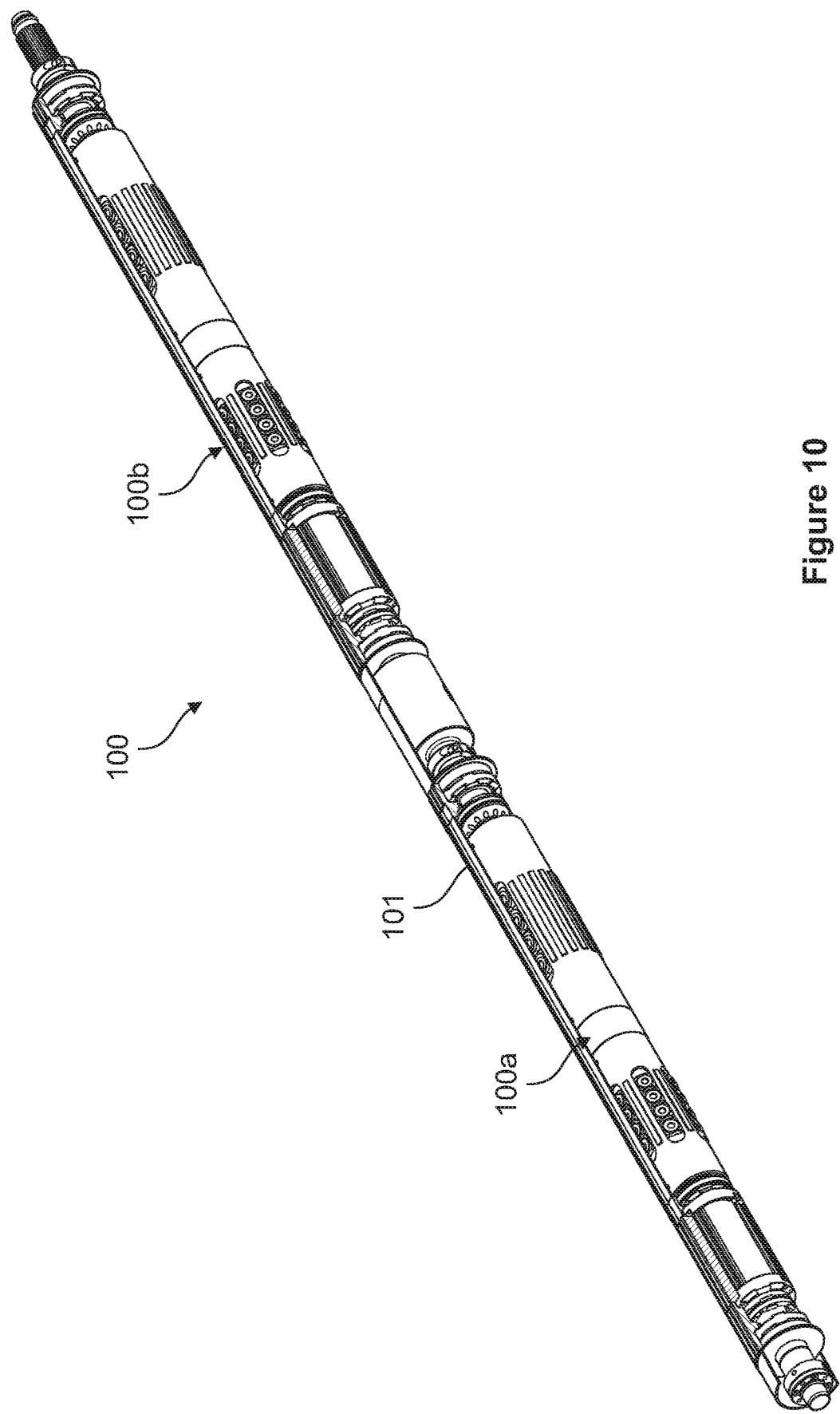
FIG. 10 illustrates a fluid-powered linear motor according to an embodiment of the disclosure.

FIG. 10 illustrates a partial cut away view of a fluid-powered linear motor (motor) 100 according to an embodiment of the disclosure. As can be seen in FIG. 10, the motor 100 includes a first motor module 100a and a second motor module 100b. In other embodiments, a motor 100 may include two or more modules depending on the torque requirements of the application. The motor 100 requires the second motor module 100b to be assembled rotationally clocked from the first motor module 100a to provide a continuous output torque as the individual modules can then transition the respective dwell point or motion reversals of their piston reciprocation while the other module is providing rotor power. Additional modules can be added and similarly offset to allow continuous rotor torque during constituent module dwell points and provide increased torque delivery for the overall assembly.

Also shown in FIG. 10 is a case or shell 101 that accommodates installation of the constituent motor modules including a splined bore to receive liner assembly 72 and mate with housing 73 and external splines 73a. The shell 101 is secured (preloaded) with a connection (threaded or welded) to hold the motor in place.

It should be appreciated that the primary rotor shaft of the motor may be connected or coupled to a rotary tool or device, such as, but not limited to a rotary cutter or bit, via a rotating collar at the forward end of the shell. Likewise, the aft end of the shell may be connected to a drillstring such that the motor introduces rotary motion relative to the drillstring connection. In addition, the motor receives a fluid from a drillstring connection or other fluid supply source as may be appreciated by one of ordinary skill in the art.

Figure 11:
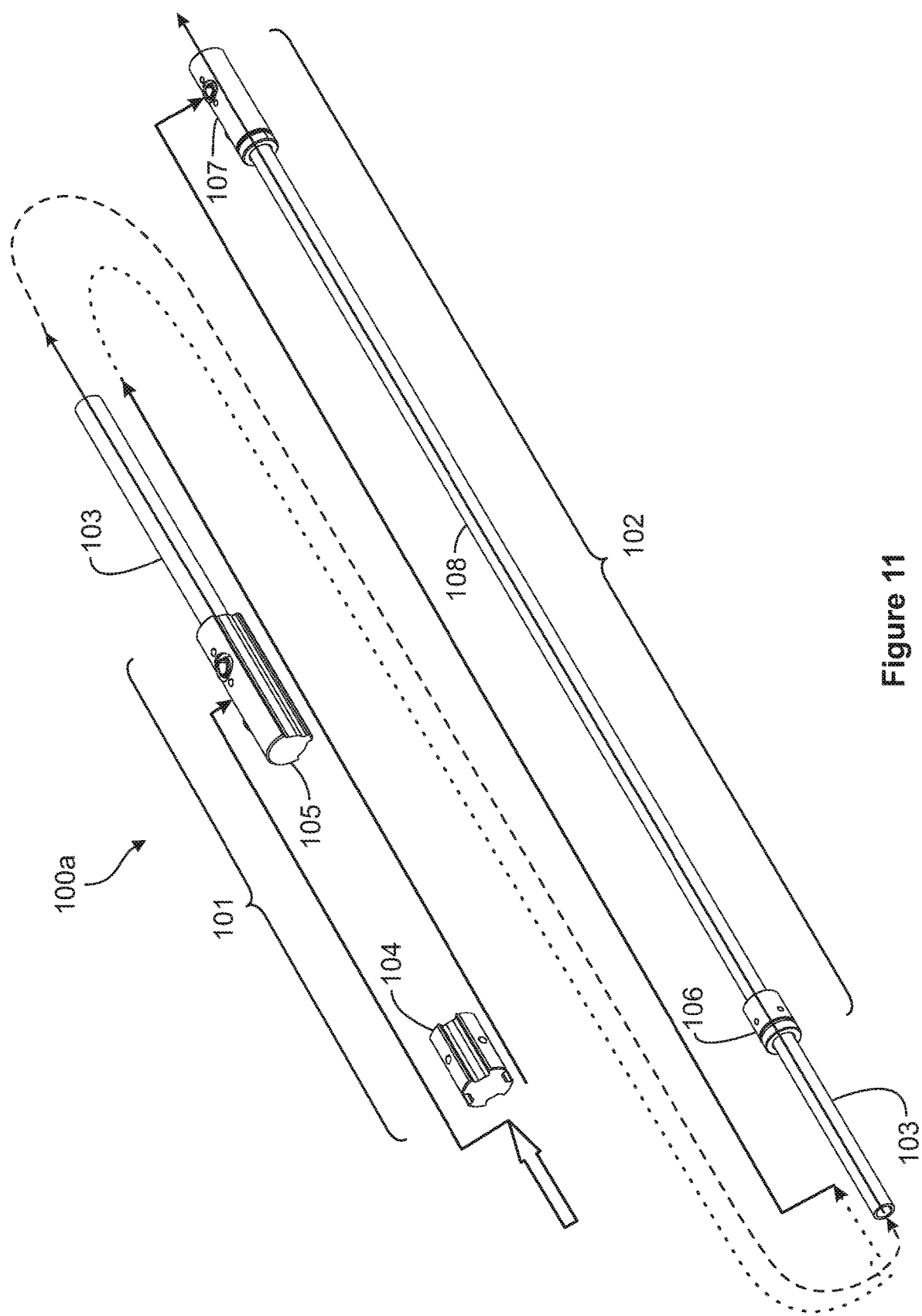
FIG. 11 illustrates working and power fluid flows through a motor module according to an embodiment of the disclosure.

FIG. 11 illustrates fluid flow paths through the motor 100 (FIG. 10). As discussed above, the fluid entering each module is separated into a working fluid flow that energizes the secondary reciprocating motor assembly of that module and a pressure fluid flow that passes through the primary rotor shaft of that module and an exhaust flow that may have been collected from previous modules. The working fluid, after performing work, is exhausted from that module as an exhaust flow. The exhaust flow is then provided to downstream module(s) to continue to pass through the motor. The pressure fluid flow, after passing through a module, is provided to a downstream module to power the secondary reciprocating motor assembly of that downstream module. Similarly, exhaust fluid flows from upstream modules must be isolated from pressure fluid flows that have yet to perform work until all exhaust fluid can be collected at the motor exit.

As can be seen in FIG. 11, an exhaust piping manifold 100a is assembled with subassembly 101 disposed within the first module 100a (see FIG. 10) and subassembly 102 disposed within the second module 100b (see FIG. 10) with the assemblies interconnected by exhaust tube 103. For the two-module motor under consideration, centralizer 104 is disposed within the first module and as such does not collect any exhaust flows from previous modules; it does allow pressurized fluid to the downstream module and accordingly has flutes cut in its periphery to allow pressurized fluid to flow by. Pressurized fluid is delivered to the first module, performs work, is collected as exhaust fluid at centralizer 105, and conveyed to exhaust tube 103 for pass through module 2. Centralizer 105 also includes flutes to allow pressurized fluid to flow by to module 2. Pressurized fluid is conveyed across these flutes within the primary rotor of module 1 and delivered to module 2. Pressurized fluid is delivered to the second module proximate centralizer 106, performs work, collected as exhaust fluid at centralizer 107, and combined with exhaust flow in exhaust tube 108 and allowed to exit the motor assembly. Comparable fluid management flow manifolds can be conceived for motors consisting of more than two modules with exhaust manifolds configured for each module according to the sequential connection of the assembly.

Figure 12:
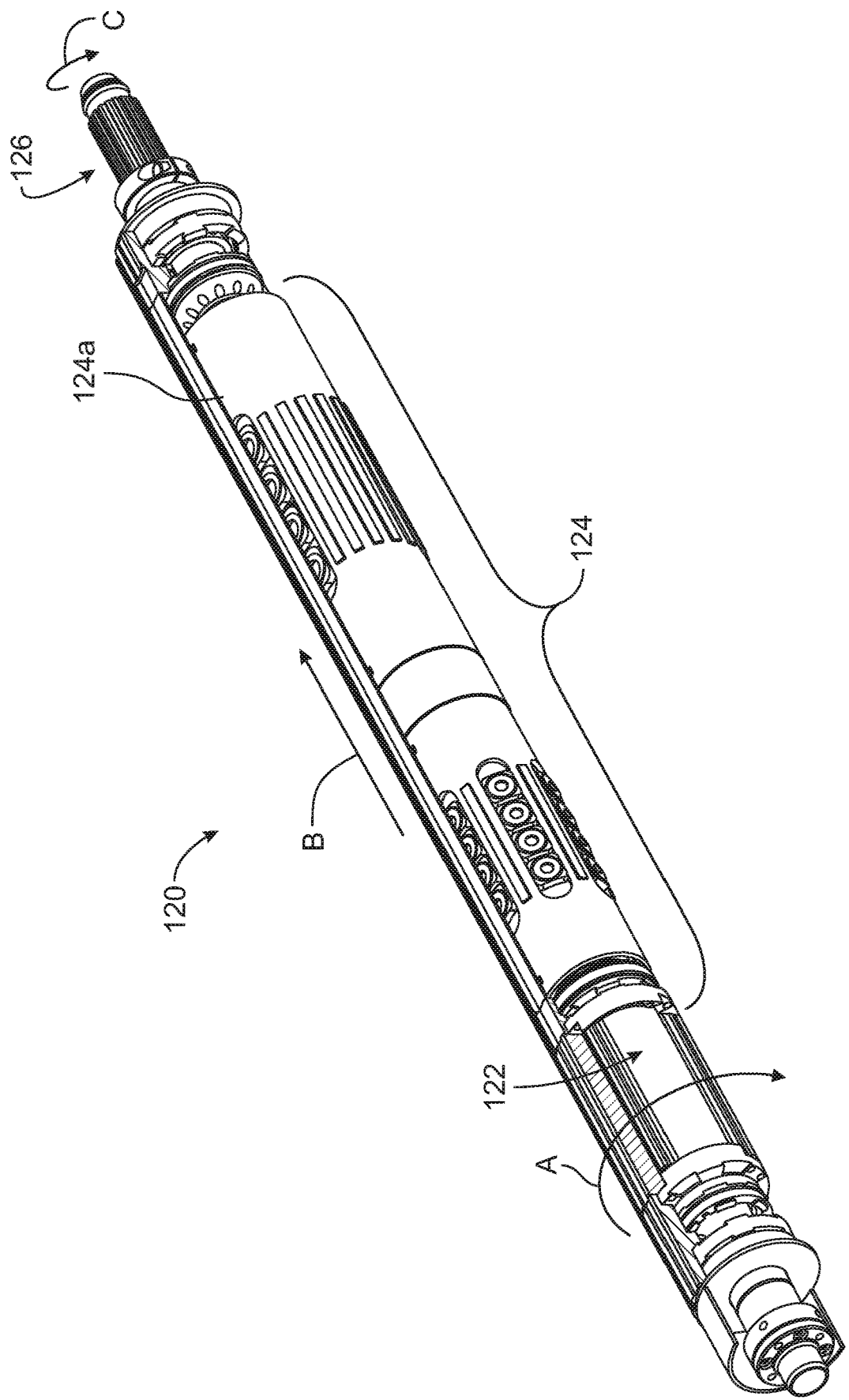
FIG. 12 is a partial cross section view of a motor module at commencement of a stroke incorporating synthetic diamond bearing assemblies according to an embodiment of the disclosure with liner assembly cutaway illustrating clockwise reciprocating rotor assembly rotation.
Figure 13:
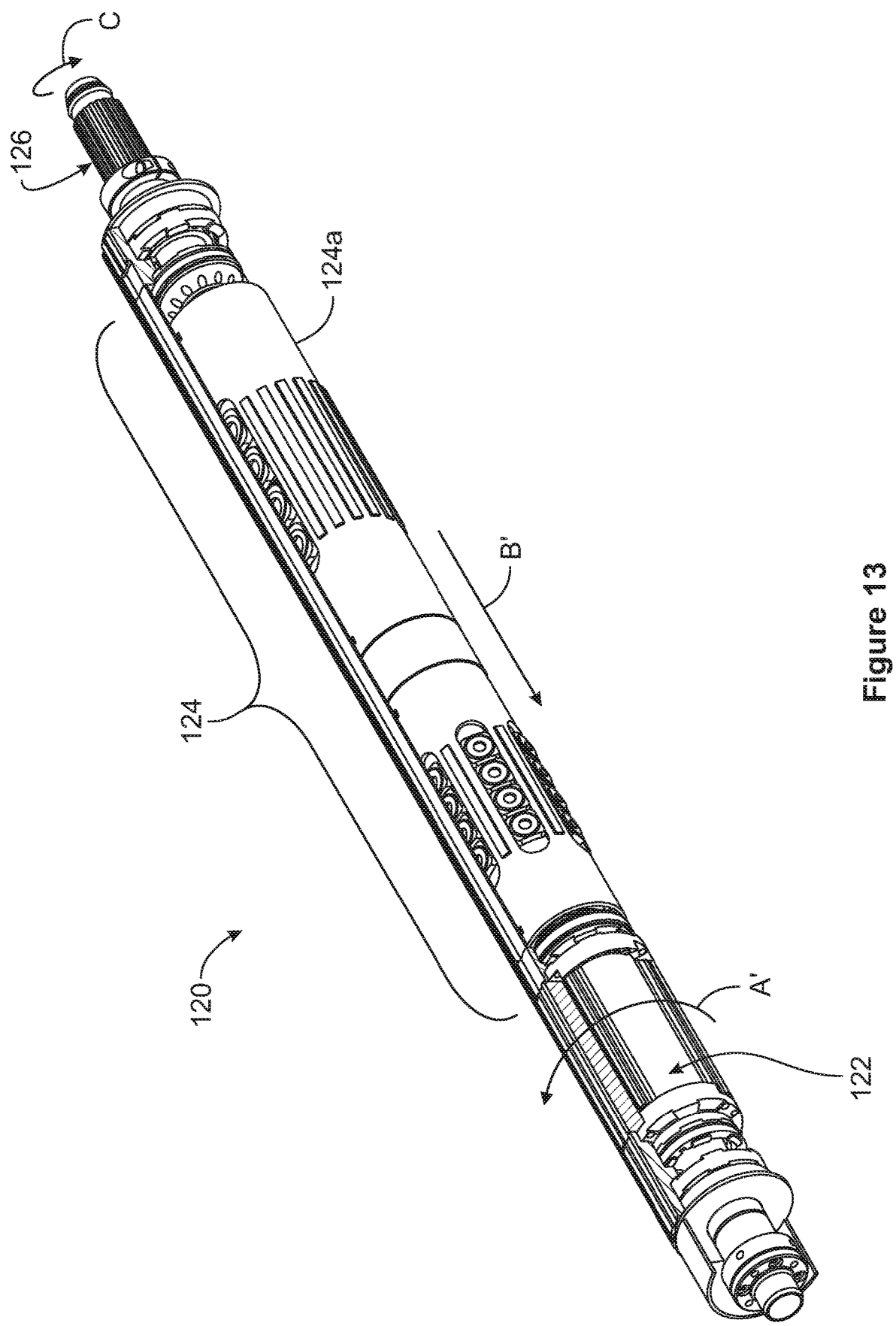
FIG. 13 is a partial cross section view of a motor module at completion of a stroke incorporating synthetic diamond bearing assemblies according to an embodiment of the disclosure with liner assembly cutaway illustrating counter-clockwise reciprocating rotor assembly rotation.

FIGS. 12 and 13 show the rotary reciprocation of the rotary piston assembly, related ring reciprocation, and the corresponding rotor rotation. FIG. 12 is a partial cross section view of a motor module 120 at the commencement of a stroke according to an embodiment of the disclosure, with liner assembly cutaway illustrating clockwise reciprocating rotor assembly rotation at commencement of stroke. As can be seen in FIG. 12, fluid is rotating the secondary reciprocating rotor assembly 122 in a clockwise direction A that imparts will forward linear motion B to the helical and harmonic drive rings 124 (driving them in the direction indicated by B) such that the harmonic drive ring 124a imparts clockwise rotation C to the primary rotor assembly 126.

FIG. 13 is a partial cross section view of a motor module according to an embodiment of the disclosure with liner assembly cutaway illustrating counter-clockwise reciprocating rotor assembly rotation at completion of a stroke. As can be seen in FIG. 13, fluid is rotating the secondary reciprocating rotor assembly 122 in a counter-clockwise direction A' that will impart a backward linear motion B' to the helical and harmonic drive rings 124 such that the harmonic drive ring 124a imparts clockwise rotation C to the primary rotor assembly 126.

Figure 14:
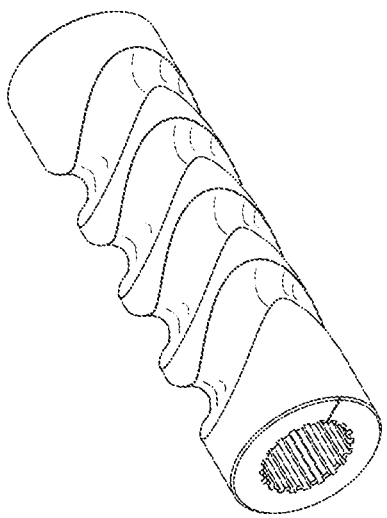
FIG. 14 is an illustration of a harmonic drive rotor according to an embodiment of the disclosure described herein using two cycles per revolution.

FIG. 14 is an illustration of a harmonic drive rotor 140 according to the present embodiment of the disclosure. As can be seen in FIG. 14, the rotor has two tracks or harmonics per revolution.

Figure 15:
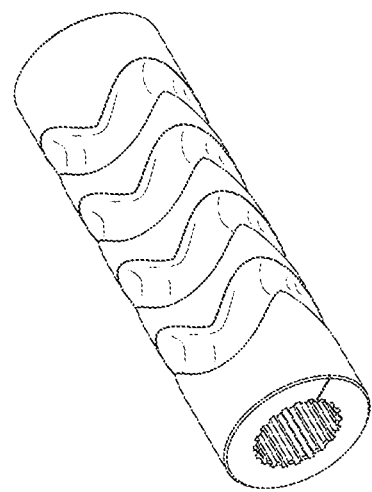
FIG. 15 is an illustration of a harmonic drive rotor according to another embodiment of the disclosure using three cycles per revolution.

FIG. 15 is an illustration of a harmonic drive rotor 140 according to another embodiment of the disclosure. As can be seen in FIG. 15, the rotor has three tracks or harmonics per revolution, resulting in 2/3 the rotor advance of the baseline embodiment of the disclosure per ring reciprocation. Hence, the output speed of the rotor can be tailored by selecting the properties of the harmonic drive.

Figure 16:
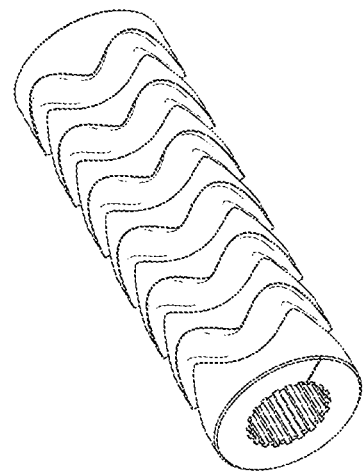
FIG. 16 is an illustration of a harmonic drive rotor according to another embodiment of the disclosure using four cycles per revolution.

FIG. 16 is an illustration of a harmonic drive rotor 140 according to another embodiment of the disclosure. As can be seen in FIG. 16, the rotor has four tracks or harmonics per revolution, resulting in 1/2 the rotor advance of the baseline embodiment of the disclosure per ring reciprocation. Hence, the output speed of the rotor can be tailored by selecting the properties of the harmonic drive.

Figure 17:
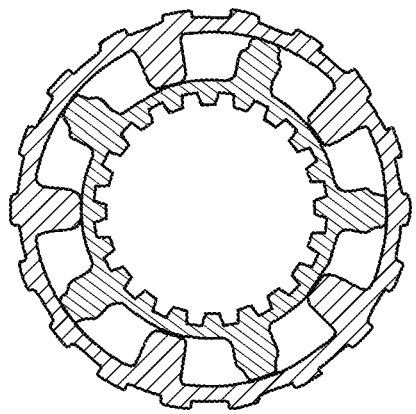
FIG. 17 is an illustration of a reciprocating rotary piston assembly and compatible stator with three rotary piston blades according to an embodiment of the disclosure.

FIG. 17 is an illustration of a reciprocating rotary piston assembly with a stator according to the present embodiment of the disclosure. As can be seen in FIG. 17, a three-blade reciprocating rotary piston assembly is used with a three-ribbed stator.

Figure 18:
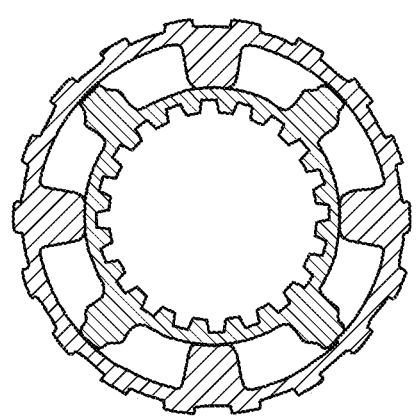
FIG. 18 is an illustration of a reciprocating rotary piston assembly and compatible stator with four rotary piston blades according to an embodiment of the disclosure.

FIG. 18 is an illustration of a four-blade reciprocating rotary piston assembly with a four-ribbed stator, resulting in 4/3 the output torque of the baseline embodiment of the disclosure for comparable pressure conditions. Hence, the rotor output torque can be increased by selecting the properties of the rotary piston assembly.

Figure 19:
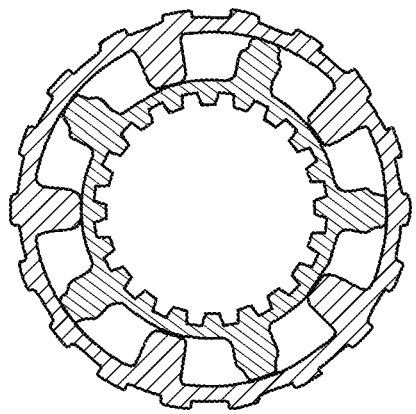
FIG. 19 is an illustration of a reciprocating rotary piston assembly and compatible stator with five rotary piston blades according to an embodiment of the disclosure.

FIG. 19 is an illustration of a five-blade reciprocating rotary piston assembly with a five-ribbed stator, resulting in 5/3 the output torque of the baseline embodiment of the disclosure for comparable pressure conditions. Hence, the rotor output torque can be increased by selecting the properties of the rotary piston assembly.

Comparing chamber volumes in FIGS. 17-19, the cumulative chamber volume of each design decreases as additional stator ribs is used thereby decreasing the required fluid volume to complete reciprocation. Hence, the input flowrate characteristics of the motor can be modified by selecting the properties of the rotary piston assembly.

Comparing ring reciprocation (axial amplitude) of various harmonic drives in FIGS. 14-16 with reciprocating rotary piston assemblies (circumferential reciprocation) in FIGS. 17-19 requires displacement compatibility via preferred selection of helical power screw properties that convert rotary piston reciprocation into axial ring displacement. Multiple configurations can be conceived by selecting the properties of the overall assembly components to achieve the desired rotor output speed and torque based upon input flow and pressure conditions.

FIG. 20 is an illustration of a radial bearing 250 according to an embodiment of the disclosure. The radial bearing accommodates radial loads and provides concentric alignment of the rotor with respect to the outer housing. The radial bearing 250 includes a radial bearing inner race 250a that is mounted to the rotor 20. The radial bearing inner race 250a includes an inner race sleeve 251a that is formed of a hardened material, such as alloy steel, stainless steel or tungsten carbide. In an embodiment, the hardened material may be tungsten carbide for high temperature operation and drilling fluid compatibility.

The radial bearing inner race 250a further includes synthetic diamond inserts 251b. The synthetic diamond inserts 251b protrude outwardly from the inner race sleeve 251a. The synthetic diamond inserts 251b are formed of a surface layer of polycrystalline synthetic diamond sintered in a high temperature material matrix 252c on a high temperature material 252d. In an embodiment, the high temperature material is a tungsten carbide substrate. The size and distribution of the diamonds within the assembly is commensurate with the radial load to be transmitted through the assembly. The radial bearing also includes a radial bearing outer race 250b that is mounted to the liner 72. The radial bearing outer race 250b includes an outer race sleeve 252a and synthetic diamond inserts 252b. The radial bearing outer race 250b includes castellations 258 to prevent rotation when mated with the liner 72. When the radial bearing inner and outer races 250a, 250b are mated, the synthetic diamond inserts of each component are sized and spaced such that they contact one another without contacting the sleeve materials. In such a manner, the opposing inserts slide across each other with low friction and low heat generation, thereby increasing the durability and lifetime of the radial bearing. Selection of diamond properties (grain size, diamond table thickness, edge chamfer conditions, diamond sintering conditions, etc.) are commensurate with operational loads and speeds.

FIG. 21 is an illustration of a thrust bearing 260 according to an embodiment of the disclosure. The thrust bearing 260 accommodates axial thrust loads and provides axial alignment of the secondary rotor 30 with respect to the primary rotor 20. The thrust bearing 260 includes first and second races 260a, 260b. The first race 260a is mounted to the primary rotor 20 and the second race 260b is mounted to the secondary rotor 30. The first and second races 260a, 260b are formed of first and second race sleeves 261a, 262a and first and second synthetic diamond inserts 261b, 262b. The race sleeves 261a, 262a and synthetic diamond inserts 261b, 262b are formed of materials discussed above regarding the radial bearing and are geometrically sized in proportion to anticipated thrust loads. The thrust bearing 260 includes castellations 268 to prevent rotational slippage when mounted on the primary rotor assembly 20 and secondary reciprocating rotor assembly 30.

FIG. 22 is an illustration of a tapered bearing 270 according to an embodiment of the disclosure. The tapered bearing 270 includes tapered bearing inner and outer races 270a, 270b. In an embodiment, described above, the tapered bearing inner race 270a and outer race 270b are mounted to the primary and secondary rotors 20, 30, and the corresponding tapered bearing race pair is attached to the liner assembly 72. The tapered bearing 270 accommodates both radial and axial thrust loads and provides radial concentric alignment and axial alignment of the primary and secondary rotors 20, 30 with respect to the liner assembly 72. The inner and outer races 270a, 270b include inner and outer race sleeves 271a, 272a and corresponding diamond inserts 271b, 272b. Inner and outer races 270a, 270b and the components thereof are formed of materials and geometrically sized as discussed above regarding the radial and thrust bearing. The tapered bearing 270 includes castellations 278 to prevent rotational slippage when mounted on the primary rotor assembly 20 and liner 72.

While certain radial, thrust and tapered bearing configurations and arrangements have been described, alternate configurations and arrangements may be possible (e.g., variations in sizes, dimensions, structures, shapes and proportions of the various elements, values of parameters, mounting arrangements, use of materials, colors, orientations, etc.) without materially departing from the novel teachings and advantages of the invention.

Integration of synthetic diamond bearing assemblies as detailed herein may be accomplished using castellations or other features between the bearing substrate or sleeve and the mating flange. In FIG. 20, keyways 253 prevent rotation of the radial bearing inner race 250a with respect to the surface that the radial bearing inner race is mounted on. In FIGS. 20, 21 and 22, castellation features 258, 268 and 278, respectively, ensure flush contact between the flange and the bearing sleeve and also provide a spline interface to prevent rotational slippage between rotating components. In other embodiments, races may be mated to flanges via other methods such as using dowels pins, fasteners, brazing, welding, or other mechanical fastening methods.

Operation

The operation of a rotary piston motor is as follows. As the rotor rotates, the valves within the first valve block assembly open to allow fluid pressure and flow into chamber A of the rotary piston assembly at the upstream end. The fluid pressure drives the rotary pistons clockwise exhausting the fluid from chamber B at the downstream end. The exhaust fluid is ported around the harmonic drive assembly and directed to the exhaust ports in the lower valve block assembly. The exhaust valves allow flow from chamber B into the exhaust manifold on rotor centerline.

As the rotary pistons rotate clockwise, an output torque is delivered to the helical drive screw assembly. This clockwise rotation and torque produces ball motion in the non-reversing track and produces forward axial motion in the helical and harmonic drive rings. The helical and harmonic drive rings apply a force to the ball(s) in the reversing track of the harmonic drive and introduces clockwise rotation and torque to the output rotor.

As the rotary pistons reach the end of stroke, the pressure and exhaust valves reverse port connections and the pressurized fluid is directed to chamber B and the fluid is exhausted from chamber A. This produces counter-clockwise motion in the rotary piston output shaft and reverses the motion of the ball(s) in the helical drive screw and causes the helical and harmonic drive rings to retract. Since the ball(s) in the harmonic drive had reached the dwell point at the end of the chamber A pressurization stroke, the ball(s) in the harmonic drive is now on the reversing track of the harmonic drive. As the helical and harmonic drive rings retract during pressurization of chamber B, clockwise motion and torque are delivered to the output rotor. When the rotary piston reaches the end of stroke, the harmonic drive(s) reaches another dwell point and the cycle is complete. The cycle repeats itself with the subsequent pressurization of chamber A and exhaust of chamber B as the rotor valves return to their initial conditions following one full or fractional rotation of the rotor.

Configurations

The harmonic drive rotor includes a specified number of harmonics. The number of harmonics on the output shaft is coupled with the number of blades on the rotary piston so that the speed output of the assembly is commensurate with the rotation-generating capacity of the rotary piston assembly. That is, as the number of harmonics on the assembly increases, the rotor advance per piston cycle will decrease; this will decrease the speed of the rotor for a given flowrate through the motor. Accordingly, the number of blades on the rotary piston can likewise increase to provide increased torque at lower speeds so that the motor can run at constant rotational power with the output torque and speed tailored to preferred values. Some of the options are shown in the top and bottom panel pairs of FIGS. 14-19.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The invention claimed is:

1. A motor module, comprising:
 a primary rotor assembly comprising a harmonic drive rotor;
 a secondary reciprocating rotor assembly coupled to the primary rotor assembly, the secondary reciprocating rotor assembly comprising a reciprocating rotary piston assembly and a helical drive screw;
 a helical drive reciprocating ring coupled to the helical drive screw; and
 a harmonic drive reciprocating ring coupled to the helical drive reciprocating ring and the harmonic drive rotor so that reciprocating motion of the secondary reciprocating rotor assembly imparts linear motion to the helical and harmonic reciprocating rings so that the harmonic reciprocating ring rotates the harmonic drive rotor to impart continuous rotary motion to the primary motor assembly; and
 one or more synthetic diamond bearings to support radial and thrust loads and combinations thereof within the assembly.

2. The motor module of claim 1, wherein the primary rotary assembly further comprises a reciprocating rotary piston assembly comprising one or more motor pistons.

3. The motor module of claim 2, wherein the one or more pistons comprise synthetic diamond inserts.

4. The motor module of claim 3, wherein the motor module further comprises races comprising synthetic diamond inserts that contact the synthetic diamond inserts of the one or more pistons to centralize and position the rotor assembly and react radial and thrust loads within the motor module.

5. The motor module of claim 1, wherein the helical drive reciprocating ring comprises ball transfers that couple the helical drive reciprocating ring to the helical drive screw.

6. The motor module of claim 1, wherein the harmonic drive reciprocating ring comprises ball transfers that couple the harmonic drive reciprocating ring to the harmonic drive rotor.

7. The motor module of claim 1, wherein the helical ring is rigidly coupled to the harmonic drive ring.

8. The motor module of claim 1, wherein the primary rotor assembly further comprises a primary rotor shaft comprising a fluid inlet and a fluid outlet for receiving and discharging the fluid.

9. The motor module of claim 1, further comprising a liner assembly disposed around the motor module for porting the fluid to and from the secondary reciprocating rotor assembly.

10. The motor module of claim 1, further wherein the liner assembly comprises two or more stator ribs that with rotary pistons of the reciprocating rotary piston assembly partially define fluid chambers that receive fluid to drive the reciprocating rotary piston assembly.

11. The motor module of claim 1, wherein the one or more synthetic diamond bearings comprise one or more radial bearings upon the composite rotor assembly that is centralized by a mating radial bearing affixed to the motor module liner to react radial loads from operation of the motor assembly.

12. The motor module of claim 1, wherein the one or more synthetic diamond bearing comprises one or more thrust bearings upon the composite rotor assembly that position the secondary reciprocating rotary piston assembly upon the primary rotor assembly that reacts thrust load from the helical drive reciprocating ring to the primary rotor from operation of the motor assembly.

13. The motor module of claim 1, wherein the one or more synthetic diamond bearings comprise one or more tapered bearings upon the composite rotor assembly that is centralized and positioned by a mating tapered bearing affixed to the motor module liner that reacts radial and thrust loads from the helical drive reciprocating ring to the secondary reciprocating rotary piston assembly and also reacts radial and thrust loads from the harmonic drive reciprocating ring to the primary rotor assembly from operation of the motor assembly.

14. The motor module of claim 1, wherein the one or more synthetic diamond bearings comprise one or more tapered bearings upon the rotary piston that is centralized and positioned by a mating tapered bearing affixed to the motor module liner that reacts radial and thrust loads from the rotary piston reciprocation from operation of the motor assembly.

15. A motor comprising:
two or more motor modules, wherein each of the two or more motor modules comprises:
  a primary rotor assembly comprising a harmonic drive rotor;
  a secondary reciprocating rotor assembly coupled to the primary rotor assembly,
  the secondary reciprocating rotor assembly comprising a reciprocating rotary piston assembly and a helical drive screw;
    a helical drive reciprocating ring coupled to the helical drive screw; and
    a harmonic drive reciprocating ring coupled to the helical drive reciprocating ring and the harmonic drive rotor so that reciprocating motion of the secondary reciprocating rotor assembly imparts linear motion to the helical and harmonic reciprocating rings so that the harmonic reciprocating ring rotates the harmonic drive rotor to impart continuous rotary motion to the primary motor assembly; and
  one or more synthetic diamond bearing assemblies to support radial and thrust loads and combinations thereof within the motor.

16. The motor of claim 15, wherein the primary rotary assembly further comprises a reciprocating rotary piston assembly comprising one or more motor pistons.

17. The motor of claim 16, wherein the one or more pistons comprise synthetic diamond inserts that contact corresponding races comprising race synthetic diamond inserts to centralize and position the rotor assembly and react radial and thrust loads within at least one of the two or more motor modules.

18. The motor of claim 15, wherein the helical drive reciprocating ring comprises ball transfers that couple the helical drive reciprocating ring to the helical drive screw.

19. The motor of claim 15, wherein the harmonic drive reciprocating ring comprises ball transfers that couple the harmonic drive reciprocating ring to the harmonic drive rotor.

20. The motor of claim 15, wherein the helical ring is rigidly coupled to the harmonic drive ring.

21. The motor of claim 15, wherein the primary rotor assembly further comprises a primary rotor shaft comprising a fluid inlet and a fluid outlet for receiving and discharging the fluid.

22. The motor of claim 15, further comprising a liner assembly disposed around the motor module for porting the fluid to and from the secondary reciprocating rotor assembly.

23. The motor of claim 22, further wherein the liner assembly comprises two or more stator ribs that with rotary pistons of the reciprocating rotary piston assembly partially define fluid chambers that receive fluid to drive the reciprocating rotary piston assembly.

24. The motor of claim 15, wherein the one or more synthetic diamond bearings comprise one or more radial bearings upon the composite rotor assembly that is centralized by a mating radial bearing affixed to the motor module liner to react radial loads from operation of the motor.

25. The motor of claim 15, wherein the one or more synthetic diamond bearings comprise one or more thrust bearings upon the composite rotor assembly that position the secondary reciprocating rotary piston assembly upon the primary rotor assembly that reacts thrust load from the helical drive reciprocating ring to the primary rotor from operation of the motor.

26. The motor module of claim 15, wherein the one or more synthetic diamond bearings comprise one or more tapered bearings upon the composite rotor assembly that is centralized and positioned by a mating tapered bearing affixed to the motor module liner that reacts radial and thrust loads from the helical drive reciprocating ring to the secondary reciprocating rotary piston assembly and also reacts radial and thrust loads from the harmonic drive reciprocating ring to the primary rotor assembly from operation of the motor.

27. The motor of claim 15, wherein the one or more synthetic diamond bearings comprise one or more tapered bearings upon the rotary piston that is centralized and positioned by a mating tapered bearing affixed to the motor module liner that reacts radial and thrust loads from the rotary piston reciprocation from operation of the motor.

28. A method for converting fluid energy to rotational energy, comprising:
providing fluid to a motor module comprising a primary rotor assembly comprising a harmonic drive rotor;
diverting a portion of the fluid to a secondary reciprocating rotor assembly coupled to the primary rotor assembly, the secondary reciprocating rotor assembly comprising a reciprocating rotary piston assembly;
energizing the reciprocating rotary piston assembly with the portion of the fluid to reciprocatedly rotate the secondary reciprocating rotor assembly; and
transferring energy from the secondary reciprocating rotor assembly to the primary rotor assembly via a mechanical rectifier to continuously rotate the primary rotor assembly; receiving the non-diverted portion of the fluid in a second primary rotor assembly to energize a second motor module; and
using one or more synthetic diamond bearings to reduce friction between the reciprocation of the secondary reciprocating rotor assembly with respect to the continuous rotation of the primary rotor assembly.

29. The method of claim 28, wherein a liner assembly ports the diverted fluid to the reciprocating rotary piston assembly to energize rotary pistons of the reciprocating rotary piston assembly.

30. The method of claim 28, wherein the non-diverted portion of the fluid is used to further energize rotary pistons and a mechanical rectifier of the second or more motor modules.

31. The method of claim 28, wherein the one or more synthetic diamond bearings centralize the primary rotor assembly to react radial loads during operation.

32. The method of claim 28, wherein the one or more synthetic diamond bearings comprises one or more thrust bearings that reacts thrust load during operation.

33. The motor module of claim 28, wherein the one or more synthetic diamond bearings comprise one or more tapered bearings that reacts radial and thrust loads during operation.

34. The motor module of claim 28, wherein the one or more synthetic diamond bearings on the pistons comprise one or more tapered bearings that react radial and thrust loads during operation.

* * * * *